United States Patent [19]
Ueda et al.

[11] Patent Number: 5,835,789
[45] Date of Patent: Nov. 10, 1998

[54] COMMUNICATION EQUIPMENT IN WHICH DATA TO BE TRANSMITTED INCLUDES A PLURALITY OF DATA GROUPS WITH INFORMATION ON DATA FORMAT AND A CONVERTER FOR CONVERTING THE DATA GROUPS

[75] Inventors: Toru Ueda, Ichihara; Yasuko Matsuoka, Chiba, both of Japan

[73] Assignee: Sharp Kabushiki Kaisha, Osaka, Japan

[21] Appl. No.: 565,693

[22] Filed: Dec. 1, 1995

[30] Foreign Application Priority Data

Dec. 1, 1994 [JP] Japan ................................. 6-298617
Jan. 23, 1995 [JP] Japan ................................. 7-008243

[51] Int. Cl.⁶ ................................. G06F 13/00
[52] U.S. Cl. ............... 395/853; 395/500; 395/200.62; 395/850; 395/200.79; 379/1; 379/83; 379/100.06; 379/100.13
[58] Field of Search .............................. 348/14; 358/434; 379/67, 1, 83, 100.06, 100.13; 395/200.01, 200.12, 500, 200.62, 200.79, 850, 853

[56] References Cited

U.S. PATENT DOCUMENTS

| | | | |
|---|---|---|---|
| 4,827,349 | 5/1989 | Ogata et al. | 358/434 |
| 5,261,052 | 11/1993 | Shimamoto et al. | 395/200.01 |
| 5,400,068 | 3/1995 | Ishida et al. | 348/14 |
| 5,416,917 | 5/1995 | Adair et al. | 395/500 |
| 5,463,676 | 10/1995 | Ohsawa | 379/67 |
| 5,621,894 | 4/1997 | Menezes et al. | 395/200.12 |

FOREIGN PATENT DOCUMENTS

| | | |
|---|---|---|
| 537554 | 2/1993 | Japan . |
| 549024 | 2/1993 | Japan . |
| 5-260242 | 10/1993 | Japan . |
| 5260176 | 10/1993 | Japan . |
| 0677995 | 3/1994 | Japan . |
| 6121051 | 4/1994 | Japan . |
| 6152751 | 5/1994 | Japan . |

*Primary Examiner*—Thomas C. Lee
*Assistant Examiner*—David Tom

[57] ABSTRACT

Communication equipment comprises a communication section 3 performing communication with other equipment via a public line, a local area network, or an infrared communication network, a resource information storing section 5 storing what format data equipment can handle, a data storing section 6 storing data to be transmitted, a data conversion section 7 converting data so that the other party of communication can interpret it, a conversion table 8 storing whether currently held data can be converted to a form that the other party of communication can interpret, a conversion- means storing section 9 storing actual conversion means, and a negotiation section 10 knowing what the resource information of equipment of the other part is.

16 Claims, 28 Drawing Sheets

SENDING SIDE

RECEIVING SIDE

FIG. 18

Sakamoto is now in a conference.
Please select your business from the followings because he will contact when he returns.

☐ please telephone

☐ telephone later

☐ leave a message ( OK ) ( Cancel )

FIG. 19

Please write your message below
because it is reported.   ( OK ) ( Cancel )

The businnes trip on 15th has been cancelled.

FIG. 20

5 phone calls received.
When viewing the message , please click on the following names.

| 6/27/94 | 14:23 | Mr.Saka |
| 6/27/94 | 15:03 | Mr.Yama |
| 6/27/94 | 15:12 | Mr.Hase |
| 6/27/94 | 15:42 | Mr.Dai |
| 6/27/94 | 16:54 | Mr.Seki (043-299-8709) |

( End )

(a) [Name] is now out.
Please select your business from the followings.

☐ please telephone
☐ telephone later
☐ leave a message (b) [Name] is now out.
Please write your message below.    OK Message

FIG. 26

```
on open
   display page1 data
end
on box1 pressed
   send "need tel"
   goto page 2
end
on box2 pressed
   send "will tell"
   goto page 3
on box3 pressed
   goto page Memo
end
```

FIG. 33

Ueda has now left his seat.
Please write your message below. (OK)

Message

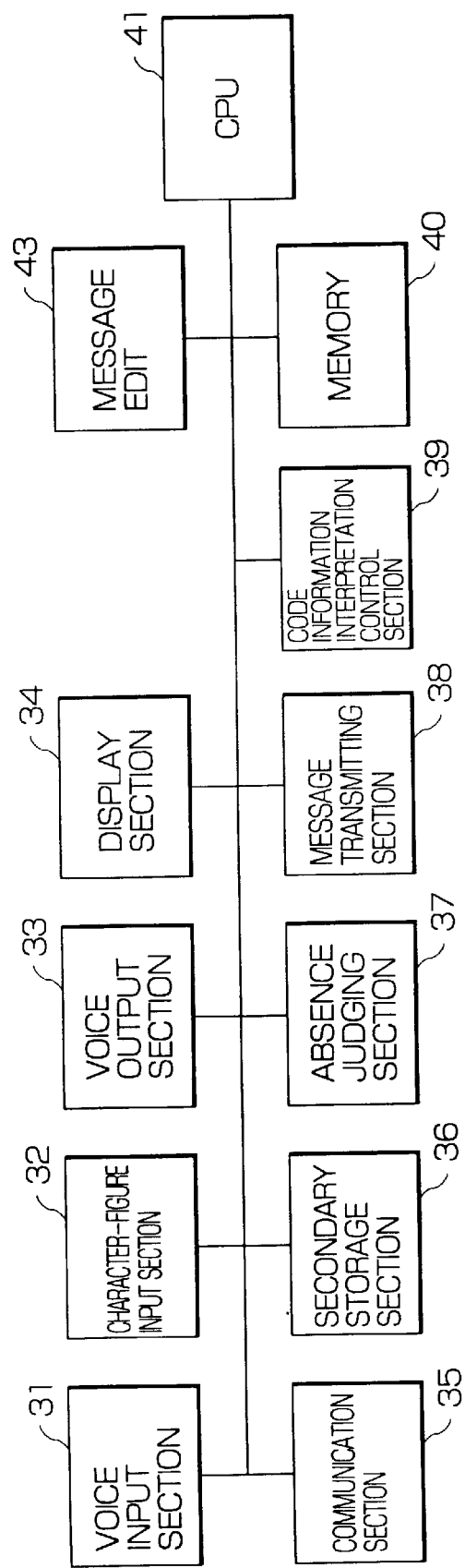

COMMUNICATION EQUIPMENT IN WHICH DATA TO BE TRANSMITTED INCLUDES A PLURALITY OF DATA GROUPS WITH INFORMATION ON DATA FORMAT AND A CONVERTER FOR CONVERTING THE DATA GROUPS

BACKGROUND OF THE INVENTION

1. Field of the Invention

The present invention relates to communication equipment, and more particularly to communication equipment which transmits and receives data such as character data, image data, and voice data via a network such as a public line network, a local area network (LAN) or an infrared communication network.

The present invention also relates to terminal equipment, and more particularly to a telephone set capable of transmitting a digital code or a personal computer and a work station capable of handling an electronic mail which can be transmitted at real time.

2. Description of the Related Art

In the data communication using a network, the transmitting side knows the data processing ability and the function on the receiving side in advance and transmits data in accordance with the ability and the function. For example, in TV broadcasting the broadcasting station side transmits a signal in the form adapted to the ability of a terminal (television). In this method, when a single data format can be assumed, there is no problem. But, when a wide variety of formats exists and a terminal can interpret only some of the formats, there is the problem that data cannot be received. This is because, when a terminal equipment on the transmitting side assumes a predetermined form and transmits data, a terminal equipment on the receiving side is often unable to interpret the predetermined form.

Also, facsimiles are known as a more advanced form than a television. In the facsimiles, information such as at what communication speed the data communication can be performed is transmitted between the negotiation sections and then data is transmitted and received at communication speed and protocol that both facsimiles can handle. This method selects a communication protocol but does not change a data format. The problem caused by the fact that data formats are different, then, is solved.

In a case where data to be handled is limited to color still images, Japan Patent Application Laying Open No. 5-260242 discloses a method which eliminates this problem. In this method, a negotiation is made prior to data communication and data is transmitted after it is converted to a format which a receiving equipment can handle.

The data which the aforementioned Japanese patent Application can handle, however, is only a color still image. No method for transmitting data other than still image data exists. Also, although data which will be handled is a color image, a description is made of only how to handle color. Also, no description is made of a difference in image size.

In the case of, for example, character data, word processors have their own formats for storing texts or figures, so when data communication is performed between word processors different in format, some conversion is needed. Likewise, a portable terminal has its own format for storing addresses or schedules. Ideally it is desirable that these different formats are standardized to a sole common format. But, in fact when the standardization is difficult, some conversion means become necessary. The same is also true of other data. In the case of dynamic images, an AVI format (Microsoft) and a Quick Time format (Apple) exist in addition to a standard format such as an MPEG1 and an MPEG2. In the case of music, even when a waveform itself is transmitted, there is room for selection about a sampling frequency or bit accuracy of one sample, and there are also some cases where transmission is performed with code information such as MIDI. It is desirable that communication equipment have an ability which can interpret the same format mutually, but when data communication is performed between different kinds of equipment, this assumption is not always established. It is desirable therefore that a negotiation be made between the sending side and the receiving side prior to data communication and that a sending equipment convert data to a format that a receiving side can handle and then transmit the converted data. Even if transmission is possible as a format, a memory capacity on the receiving side can be problematic.

Incidentally, answering machines storing voice on a tape or a semiconductor memory have hitherto been used as a means for storing phone calls received during one's absence. Also, Japanese Patent Application Laying Open No. 5-260176 discloses a method of selecting and displaying any of messages previously stored. These methods are means of communication where voice is basically transmitted, and when the other party of communication is absent, voice is stored as a message, or a message is selected from limited messages and displayed on the terminal of the other party. Furthermore, Japanese Patent Application Laying Open No. 6-152751 discloses a method where a sender can selectively leave or transmit messages when the other party is absent.

An electronic mail is known as a means for performing a storage type communication different from a phone call. The electronic mail is basically designed for storing messages by way of a personal computer or a work station and is not designed for transmitting messages at real time. The electronic mail is mainly transmitted by code. Since this electronic mail is basically done with code information, a return message can be made simple. A wide variety of electronic mail has been developed as disclosed in Japanese Patent Application Laying Open No. 5-37554. Also, Japanese Patent Application Laying Open No. 6-77995 discloses a system provided with a function sending a control signal to an exchange so that a phone call can be replied with respect to the message transmitted by electronic mail. In addition, Japanese Patent Application Laying Open No. 6-121051 discloses a system where the connection to both of local area network (LAN) and public telephone network can be made in order to perform the functions of an electric mail and a phone call at the same time.

Furthermore, Japanese Patent Application Laying Open No. 5-49024 discloses a system where picture images, voice, and files are transmitted from the same terminal by use of integrated services digital network (ISDN).

In the answering machine a voice message is recorded and left when the other party of communication is absent, and when the other party desires to hear the recorded message from outside, the message is reproduced by inputting a reproduction command to the answering machine (or exchange with a message function) from the telephone in that place. But in a case where a large number of messages are left, it is impossible to hear all the messages at one time and therefore it takes a long time to hear each message.

Also, even in the method where a sender can selectively leave or transmit messages when the other party is absent, it takes a certain time to hear all voice messages and it is difficult to select necessary or important messages.

SUMMARY OF THE INVENTION

The present invention has been made in order to overcome the problems described above. It is accordingly a principal object of the present invention to provide communication equipment which is capable of performing data communication even when data formats are different.

Another objective of the present invention is to provide a terminal equipment which is capable of displaying information received at the time of absence as character information and transmitting information to a selected person by a single operation.

To achieve this end, there is provided according to the present invention communication equipment for transmitting and receiving information including all or some of characters, images, figures, voice, music data, and digitized data, comprising (1) resource information storing means for storing information on a resource comprising hardware and software for processing data, (2) negotiation means for communicating with other communication equipment on a receiving side to judge if said other communication equipment on the receiving side has the same resource, and (3) conversion means which, when said other communication equipment does not have the same resource, performs data conversion, based on a conversion table stating conversion means for converting data to be transmitted to data that said other communication equipment on the receiving side can process.

According to the communication equipment of the above, hardware and software information is stored by means of the resource information storing means. Also, prior to data transmission, the negotiation means communicates a receiving side to judge if the receiving side has the same resource. Furthermore, when the equipment does not have a resource for processing transmission data, the conversion means performs data conversion, based on a conversion table stating conversion means for converting data to be transmitted to data that can be processed with the resource of the receiving side. With this, the difference in hardware, software, and data format between equipment is absorbed and therefore users can always receive or transmit optimum data independently of the difference.

In a preferred form, the communication equipment further comprises performance evaluation value storing means for storing a performance evaluation value representative of calculation performance of said communication equipment, and performance comparing means for comparing said performance evaluation value of said communication equipment with a performance evaluation value of said other communication equipment on the receiving side. The performance evaluation value of said communication equipment and the performance evaluation value of said other communication equipment on the receiving side are compared, and said data conversion is performed with one of said communication equipment which is superior in performance evaluation value.

According to the communication equipment above, a performance evaluation value representative of calculation performance of a communication equipment is stored by the performance evaluation value storing means, and the performance evaluation value on the sending side and the performance evaluation value on the receiving side are compared by the performance comparing means. In a case where conversion of a data format is necessary when performing data communication and also where both the sending side and the receiving side can perform the conversion, calculation performances are compared and the data conversion is performed with one of the communication equipment which is superior in performance. With this, the communication time, including the format conversion, can be shortened.

In another preferred form of the invention, the communication equipment further comprises original-address storing means for storing where original data exists with respect to each data, and original-address adding means for adding, at the time of communication, information on where original data exists. When said original data is desired to be obtained at said other communication equipment on the receiving side, said original data is obtained from the other communication equipment having said original data, based on an instruction from a user.

According to the communication equipment above, where original data exists with respect to each data is stored by the original-address storing means, and information on where original data exists is added at the time of communication by the original-address adding means. When the original data is desired to be obtained at the equipment on the receiving side, the original data is obtained from the equipment having the original data, based on an instruction.

In still another preferred form according to the the invention, said conversion table and said resource information storing means are a writable medium.

According to the communication equipment above, said conversion table and said resource information storing means are a writable medium. With this, new resource information can be readily added.

In a further preferred form according to the invention, the communication equipment further comprises conversion requesting means for requesting data conversion of a third communication equipment differing from said communication equipment and said other communication equipment on the receiving side, and conversion accepting means for accepting conversion from the other communication equipment. When data cannot be converted at said communication equipment to a form that said other communication equipment on the receiving side can process, data conversion is requested of said third communication equipment and the converted data is sent to said other communication equipment on the receiving side.

According to the communication equipment above, data conversion is requested of a third equipment by the conversion requesting means, and data conversion from other communication equipment is accepted by the conversion accepting means. When data cannot be converted at the sending side to a form that the receiving can interpret, data conversion is requested of the third equipment and the conversion result is sent to the receiving equipment. With this, format conversion which cannot be performed by the sending and receiving sides can be performed.

In a further preferred form according to the invention, the communication equipment further comprises communication time estimating means for estimating a communication time needed for data transmission for each of various data conversions, display means for displaying an evaluation time of said communication time for each said data conversion, and selection means for selecting an arbitrary method based on information on the kind of said data conversion and said communication time displayed on the said display means.

According to the communication equipment above, a communication time needed for data transmission for each of various data conversions is estimated by the communication time estimating means. When data is transmitted or received, an evaluation time of said communication time is displayed for each data conversion by the display means. An arbitrary method is selected based on information on the kind of the data conversion and the communication time displayed on the said display means, by the selection means. Therefore, users are able to select an appropriate conversion method.

In a further preferred form according to the invention, the communication equipment further comprises output-information storing means for storing information including software for processing current data to be transmitted. When said other communication equipment does not have said information including software for processing current data but communication equipment on a sending side has said information, said information is transmitted together with said current data.

According to the communication equipment above, the information, including software for processing current data to be transmitted, is stored by the output-information storing means. In a case where the output information is transmitted and received by the output-information storing means and also where the receiving side does not have the information, including software for outputting or processing data, and the sending side has the information, the information is transmitted together with data. Therefore, data can be processed without performing conversion.

In accordance with the present invention, the foregoing objective is also accomplished by a terminal equipment for transmitting and receiving a message consisting of data such as voice, characters, and figures, and a code controlling an operation of a terminal, comprising absence judging means which, when a message is received, judges that a user is absent; transmitting means which, when the user is judged to be absent by said absence judging means, automatically transmits an absence message to a sender of the received message; secondary storage means for storing transmission messages, reception messages, a history of transmissions and receptions, and data characteristic to senders; and display means for displaying said history stored in said secondary storage means as character information.

In the terminal equipment above, the absence judging means judges if a user is absent, when a message is received. If a user is judged to be absent, the transmitting means will automatically transmit an absence message to a sender of the received message. With this, the sender of the message which was received when the user is absent is notified that the message was automatically received and that the user is absent. The secondary storage means stores transmission messages, reception messages, a history of transmissions and receptions, and data characteristic to senders. The display means displays said history stored in said secondary storage means as character information. With this, the user can view the history of the transmitted and received messages in character and also only necessary information quickly.

In a preferred form of the invention, the terminal equipment further comprises code information control means which, when the user selects the other party of transmission from said history displayed on said display means, provides control so that a message is transmitted by use of said data stored in said secondary storage means.

In the terminal equipment above, when the user selects the other party of transmission from said history displayed on said display means, the code information control means provides control so that a message is transmitted by use of said data stored in said secondary storage means. With this, the user is able to transmit a message with a single operation where the other party of transmission is selected.

In another preferred form of the invention, the terminal equipment further comprises fixed-pattern storage means for storing a plurality of patterns of said absence message.

In the terminal equipment above, a plurality of patterns of said absence message are stored in the fixed-pattern storage means. With this, an appropriate absence message pattern can be transmitted according to the other party and the contents of the received message.

In still another preferred form of the invention, the terminal equipment further comprises message editing means for a user to make said absence message.

Furthermore, in the terminal equipment above, the user is able to make his own message by the message editing means. With this, an appropriate absence message can be transmitted according to the other party and the contents of the received message, and when the user knows that the other party is absent, the user is able to send various kinds of messages.

In a further preferred form of the invention, the terminal equipment is characterized by that said code information control means receives a message including a code requesting communication and provides control so that communication with a sender is performed when the user selects performing communication.

In the terminal equipment above, the code information control means receives a message including a code requesting communication and provides control so that communication with a sender is performed when the user selects performing communication. With this, at the same time a message is transmitted, a communication with the other party can be easily performed.

In a further preferred form of the invention, the terminal equipment is characterized by that said code information control means provides control so that when a message is displayed, a message including a code requesting communication is displayed on said display means, and when the user selects performing communication, communication with a sender is performed.

Moreover, in the terminal equipment above, the code information control means provides control so that when a message from the other party is displayed, a message including a code requesting communication is displayed on said display means, and when the user selects performing communication, communication with the other party is performed. With this, the communication with the other party can be easily performed while viewing the message.

In a further preferred form of the invention, the terminal equipment is characterized by that said secondary storage means stores data, which the user inputs, in the same data form as said absence message.

In the terminal equipment above, the data that the user inputs is stored in the same data form as the absence message by the secondary storage means. With this, information related with a message can be processed at the same time.

Further objects and advantages of the present invention will be apparent from the following description of the preferred embodiments of the present invention as illustrated in the accompanying drawings.

BRIEF DESCRIPTION OF THE DRAWINGS

FIG. 18 is a diagram showing an example of the message of absence of the first embodiment;

FIG. 19 is a diagram showing an example of the display for inputting a message of the first embodiment;

FIG. 20 is a diagram showing an example of the display of a history of the first embodiment;

FIG. 26 is a diagram showing an example of the codes of the third embodiment;

FIG. 33 is a diagram showing an example of the display for inputting a memo of the sixth embodiment;

FIG. 35 is a block diagram showing the third embodiment of the terminal equipment of the present invention.

DESCRIPTION OF THE PREFERRED EMBODIMENTS

A first preferred embodiment of communication equipment will hereinafter be described while referring to the accompanying drawings.

Figure 1:
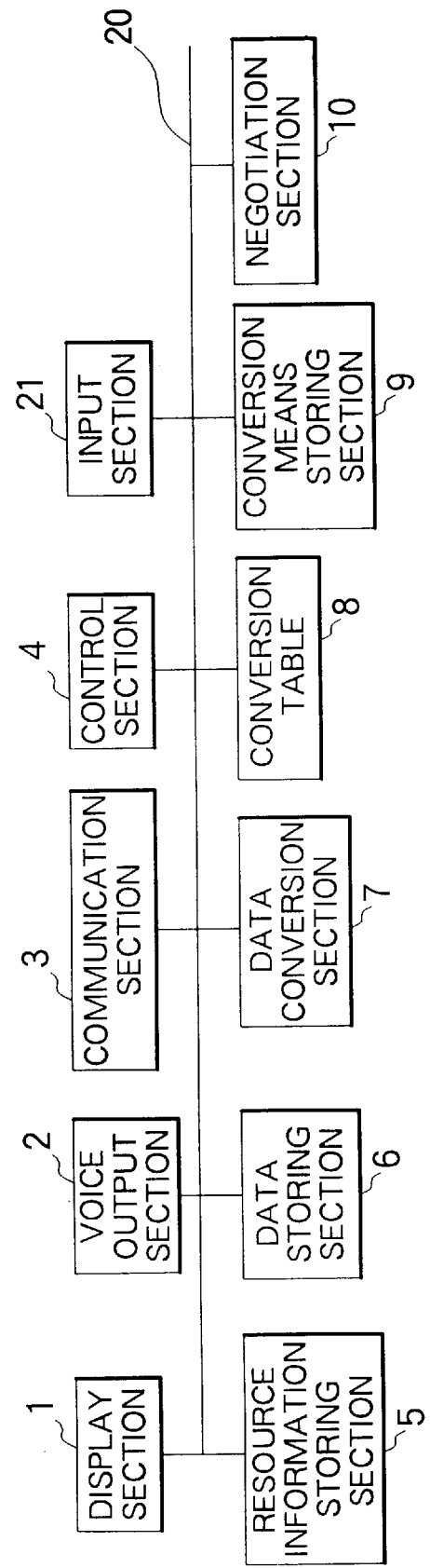
FIG. 1 is a block diagram showing a first embodiment of the communication equipment.

The communication equipment of this embodiment comprises a control section 4 as control means for controlling each section, as shown in FIG. 1. To the control section 4 there is connected, through a bus line 20, a display section 1 as image display means for a still image and a dynamic image in a text form, a voice output section 2 as voice output means for outputting music or voice, a communication section 3 as communication means for performing communication with other equipment via a public line, a local area network, or an infrared communication network, and an input section 21 as selection means for inputting an instruction. Furthermore, to the bus line 20 there is connected a resource information storing section 5 as resource information storing means for storing what format data equipment can handle, a data storing section 6 for storing data to be transmitted, and a data conversion section 7 as data conversion means for converting data so that the other party of communication can interpret it. Moreover, to the bus line 20 there is connected a conversion table 8 as conversion table means for storing information as to whether currently held data can be converted to a form that the other party of communication can interpret, a conversion-means storing section 9 as conversion-means storing means for storing actual conversion means, and a negotiation section 10 as negotiation means for knowing what the resource information of equipment of the other part is.

Note that it has been supposed in the aforementioned construction that data received is seen or heard by a person, but the received data does not need to be output particularly to a person and therefore the output section may be replaced with a processing section. Also, data to be received is not limited to voice, music, images, and characters but it may be data of spread sheet software, data of computer aided design (CAD), or data of LSI wiring if the data is a digital numerical string which is fixed in form. In such a case, the voice output section of FIG. 1 is replaced with a data processing section.

Figure 2:
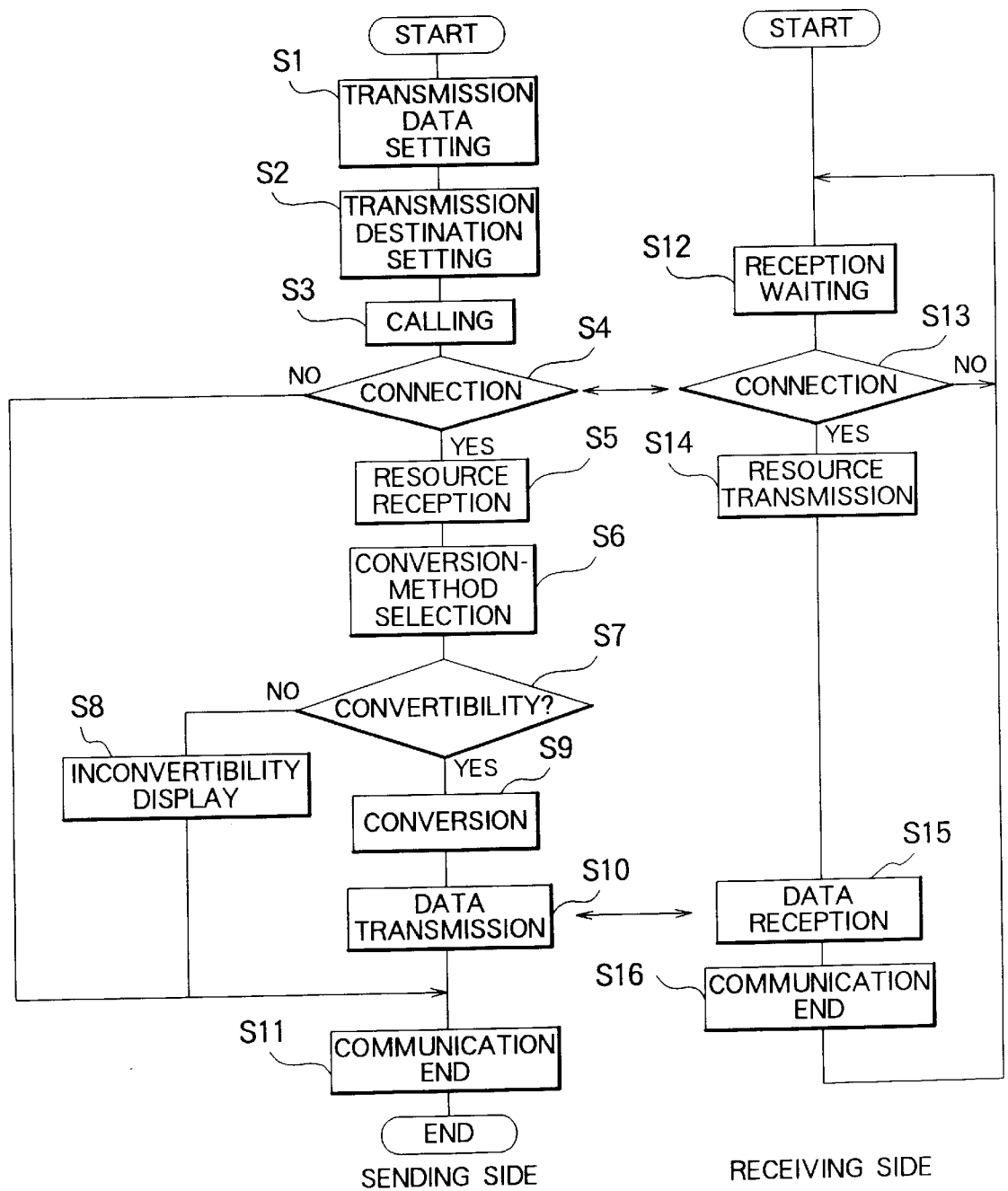
FIG. 2 is a flowchart showing the operation of the embodiment of the communication equipment.

Now, the operation of this embodiment will be described along a flowchart of FIG. 2.

In step S1 transmission data is set and in step S2 a destination of transmission is set. In step S3 a transmission request is sent to the other party of transmission that was set in step S2, and in step S4 whether the connection is successful is judged. If the connection fails, in step S11 the communication will be ended. If the connection is successful, in step S5 the resource information that a terminal of the other party of transmission has will be received. In step S6 the user selects an arbitrary conversion method by the input section 21 in reference to the conversion table 8. In step S7 whether there is the selected conversion method is judged. Of course, even when data does not need to be converted, the data is judged as being convertible. If there is not the selected conversion method, in step S8 that effect will be displayed on the display section 1 and in step S11 the communication will be ended. In this case the communication ends, but when different formats are used in one data, for example, when characters and still images exist together, some of them (for example, only characters) can be transmitted. In such a case, the communication does not end and only what can be transmitted may be transmitted. If there is the selected conversion method, in step S9 the data will be converted so that it can be interpreted by the receiving side. When conversion is unnecessary, nothing is done. In step S10 the converted data is transmitted and in step S11 the communication is ended.

In the receiving side, in step S12 the transmission request waits for a chance for data to be accepted. In step S13 the transmission request is accepted and whether the connection was established is determined. When the connection is not established, the transmission request waits for a chance again for data to be accepted. When the connection is established, in step S14 the resource information that the receiving side equipment has is transmitted. In step S15 the data in the form that the receiving side can interpret is received and in step S16 the communication is ended.

While in the aforementioned flow the data conversion has been performed at the sending side, the conversion may be performed at the receiving side. Also, while it has been described in the aforementioned flow that the side generating a call transmits data, of course that side may receive data. This is true of the following embodiments. Note that if the resource information of the other party of communication continues stored even after the end of the communication, the negotiation will not be needed from the next communication. In such a case, when the resource information of the other party is changed for some reasons, it is necessary to inform of the change. In addition, If there is a function copying the output form of other types of machines and the resource information of the other party has been stored, in which form the other party sent data can be confirmed before or after transmission.

Figure 3:
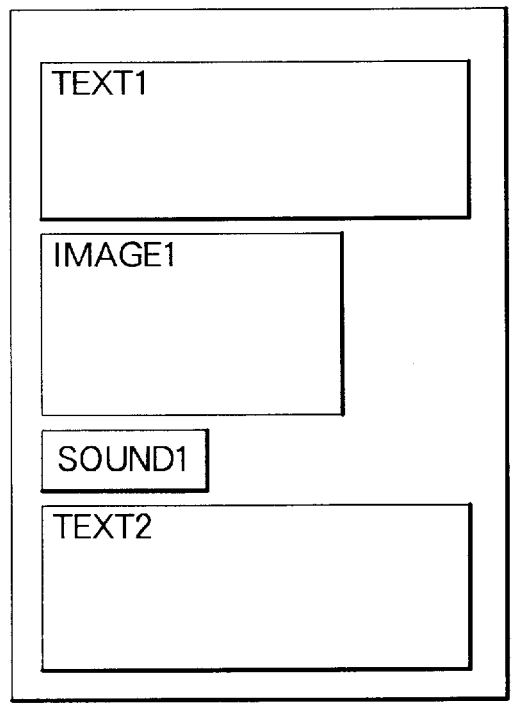
FIG. 3 is a diagram showing an example of transmission data.

An example of transmission data is shown in FIG. 3. This example contains TEXT 1, TEXT 2, IMAGE 1, and SOUND 1. In this case, data is transmitted, for example, in a form such as that shown in Table 1. In this example, a format is specified following a key ##. The first data of this example is TEXT 1 which is a text written in EUC code. Next, still image data of JPEG is stored. Next after the next, music data in the form of MIDI and finally a text in the form of EUC are stored.

TABLE 1

EUC TEXT
This is a text.
JPEG
(JPEG data)
MIDI SOUND
(MIDI data)
EUC TEXT
The end of the test.

An example of data converted by the aforementioned conversion method is shown in Table 2. The text is converted from EUC code to SJIS (shift JIS) code. The JPEG data is converted to bit map data. The MIDI remains unconverted.

TABLE 2

SJIS TEXT
This is a text.
BITMAP
(BITMAP data)
MIDI SOUND
(MIDI data)
SJIS TEXT
The end of the test.

Table 3 shows an example of the resource information files that equipment has. This example shows that EUC texts, BITMAT, and MIDI can be interpreted. That is, only what can be interpreted can be transmitted and received. As shown in this example, it is desirable that address data and schedule data also be registered as resource information. By making a conversion program, addresses and schedules different by the type of machine can be converted without making users conscious.

TABLE 3

EUC TEXT
BITMAT (640 × 480)
MIDI
JPEG
TIFF
ZAURUS ADDRESS
ZAURUS SCHEDULE
ZAURUS MEMO
LOTUS 1-2-3
SHOIN WP
:
:

Table 4 shows an example of a conversion table. This example is stated in the form of a format before conversion, a convertible format 1, a convertible format 2, . . . .

TABLE 4

EUC TEXT: SJIS TEXT, JIS TEXT
SJIS TEXT: EUC TEXT, JIS TEXT
JIS TEXT: EUC TEXT, JIS TEXT
TIFF:BITMAP, *JPEG
JPEG:BITMAP, TIFF
BITMAP: *JPEG, TIFF

Note that the "*", added before the name of a format, denotes irreversible conversion. The irreversible conversion is referred to as conversion where an A is converted to a B and the B cannot be restored completely to the original A when the B is again converted to the A. In other words, the irreversible conversion is referred to as conversion where part of original information is lost when converted. The irreversible conversion does not relate to the first embodiment of the present invention. The conversion used herein means an operation which creates another data by use of original data or accompanying information, for example, file names, creation dates, and data preparation device addresses. An operation, where original data which is an image is replaced only with the address of a machine having the original data, the file name of the image, and the size of the hight and width of the image, is also called conversion. Likewise, an operation which extracts one or several sheets of still image from dynamic image data to create data is also conversion.

Now, a second embodiment of communication equipment will be described while referring to the accompanying drawings. Note that the same reference numerals will be applied to the same constitutional parts as FIG. 1 and therefore a description is omitted.

Figure 4:
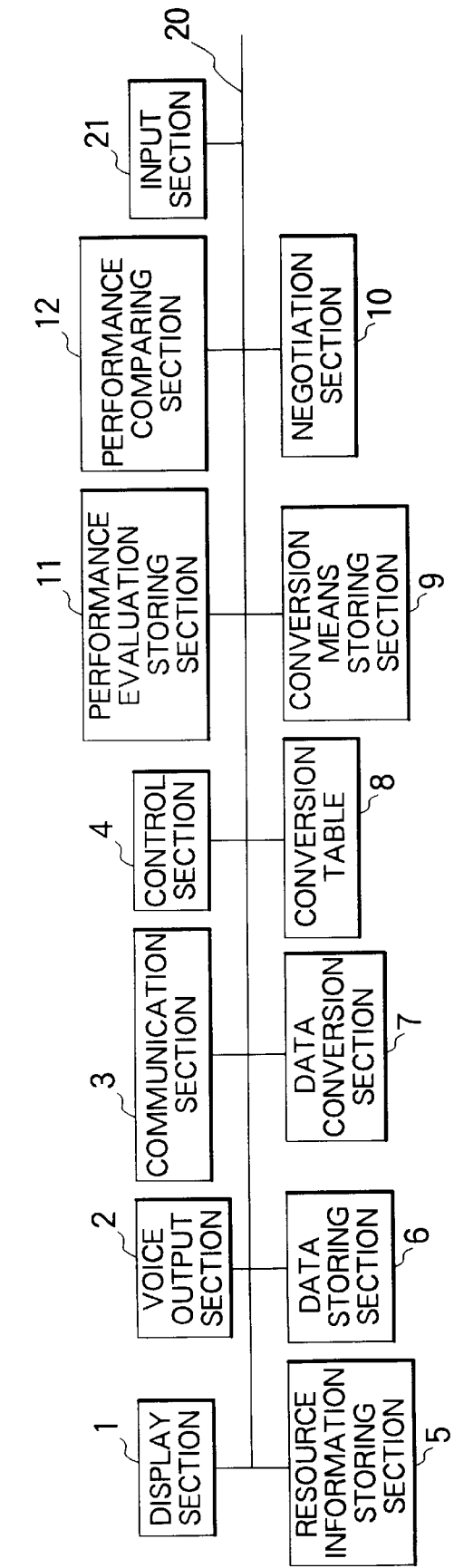
FIG. 4 is a block diagram showing a second embodiment of the communication equipment according to the present invention.

The communication equipment of this embodiment is provided with a performance evaluation storing section 11 as performance evaluation value storing means representing a performance of conversion of the machine type of the equipment and a performance comparing section 12 as performance comparing means for comparing the conversion performance of the machine type with a performance evaluation sent from the machine type of the other party of communication, as shown in FIG. 4.

Figure 5:
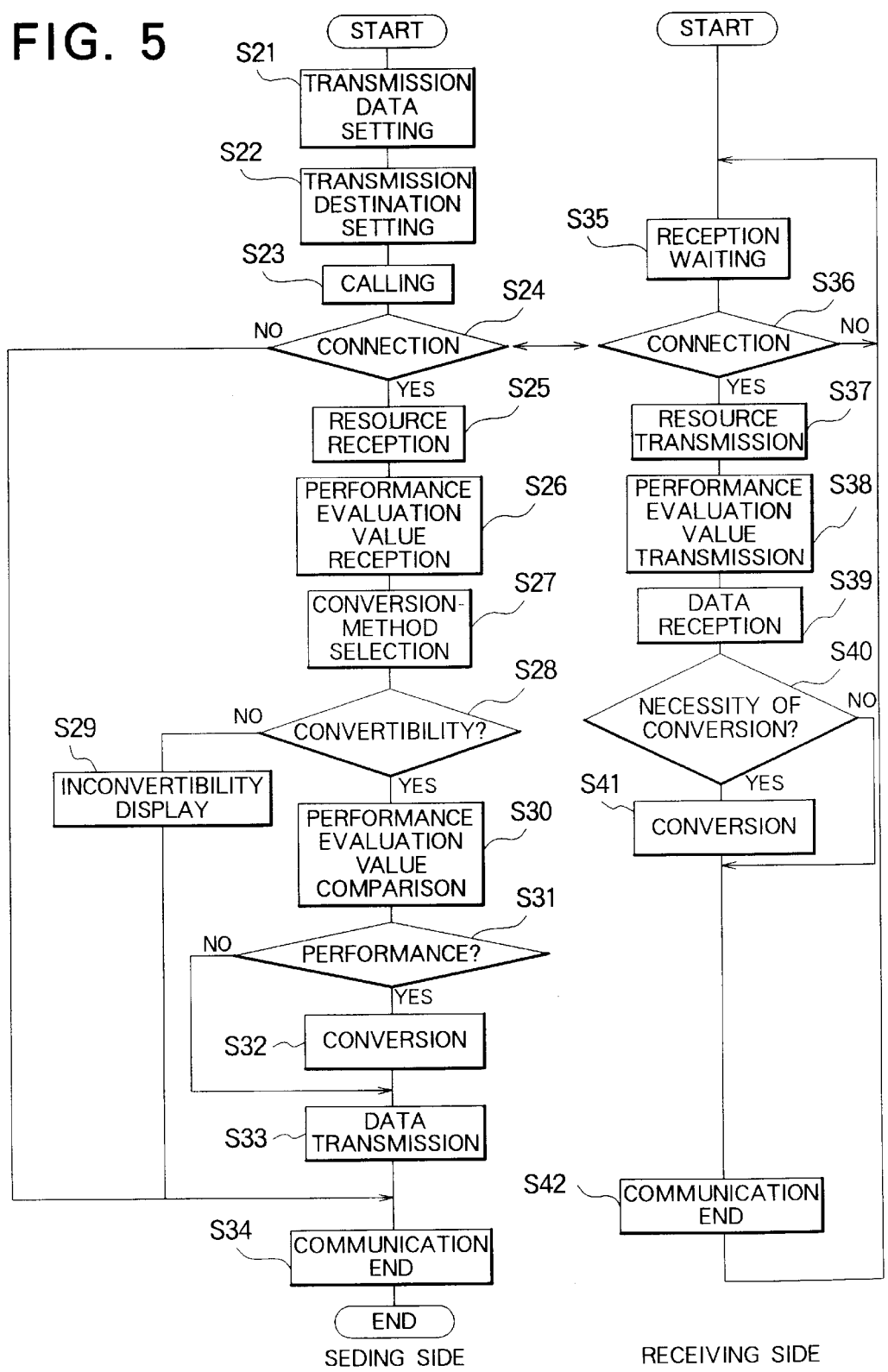
FIG. 5 is a flowchart showing the operation of the second embodiment of the communication equipment.

Now, the operation of this embodiment will be described along a flowchart of FIG. 5.

In step S21 transmission data is set and in step S22 a destination of transmission is set. In step S23 a transmission request is sent to the other party of transmission that was set in step S22, and in step S24 whether the connection is successful is judged. If the connection fails, in step S34 the communication will be ended. If the connection is successful, in step S25 the resource information that a terminal of the other party of transmission has will be received. In step S26 the performance evaluation value of the other party of transmission is received. In step S27 a conversion method is selected by an input section 21 in reference to a conversion table 8. In step S28 whether there is the selected conversion method is judged. Of course, even when data does not need to be converted, the data is judged as being convertible. If there is not the selected conversion method, in step S29 that effect will be displayed on the display section 1 and in step S34 the communication will be ended. In this case the communication ends, but when different formats are used in one data, for example, when characters and still images exist together, some of them (for example, only characters) can be transmitted. In such a case, the communication does not end and only what can be transmitted may be transmitted. If there is the selected conversion method, in step S30 the performance evaluation value of the machine type on the sending side and the performance evaluation value of the equipment on the receiving side will be compared. In step S31 whether the performance evaluation value of the machine type on the sending side is better than that of the equipment on the receiving side is judged. If the performance evaluation value of the machine type on the sending side is high, in step S32 the data will be converted in the sending side so that it can be interpreted by the receiving side. When conversion is unnecessary, nothing is done. In step S33 the converted data is transmitted and in step S34 the communication is ended.

On the other hand, in the receiving side, in step S35 the transmission request waits for a chance for data to be accepted. In step S36 the transmission request is accepted and whether the connection was established is determined. When the connection is not established, the transmission request waits for a chance again for data to be accepted. When the connection is established, in step S37 the resource information that the receiving side equipment has is transmitted. In step S38 the performance evaluation value is transmitted. In step S39 the data is received. In step S40 the resource information and the format of current data are compared and whether conversion is necessary is judged. If "YES", in step S41 conversion will be performed. In step S42 the communication is ended.

While in the aforementioned flow a performance evaluation value has been received before selecting the conversion method, of course the performance evaluation value may be received after data is judged to be convertible. Also, the performance evaluation value is not only a single value, but it is desirable that the value is stored for each conversion method. Depending upon the performance of a machine type, there are some cases where some conversions can be performed at relatively high speeds but other conversions are performed at relatively low speeds. Therefore, if performance is stored for each conversion method, a comparison of conversion speed with respect to current necessary conversion will become possible and conversion can be processed more efficiently. Also, while in this example the performance evaluation value has been previously measured and set by a speed measuring program, the performance evaluation value may be dynamically changed according to the load of a device, for example, when a plurality of programs run and the load of a CPU is large. In such a case, a converting operation will not be performed in a machine type whose load is larger, if possible. It is possible for the user to specify which set of equipment is going to convert data, independently of the size of the load of a CPU. In this case, even when both equipment can convert data, it is possible at all times for the machine to request the user to inquire the machine to specify which set of equipment is used. It is also possible to store, for example, "If equipment of the other party is X, then conversion will be performed at the other party side" in advance.

Now, a third embodiment of the communication equipment will be described while referring to the accompanying drawings. Note that the same reference numerals will be applied to the same constitutional parts as FIG. 1 and therefore a description is omitted.

Figure 6:
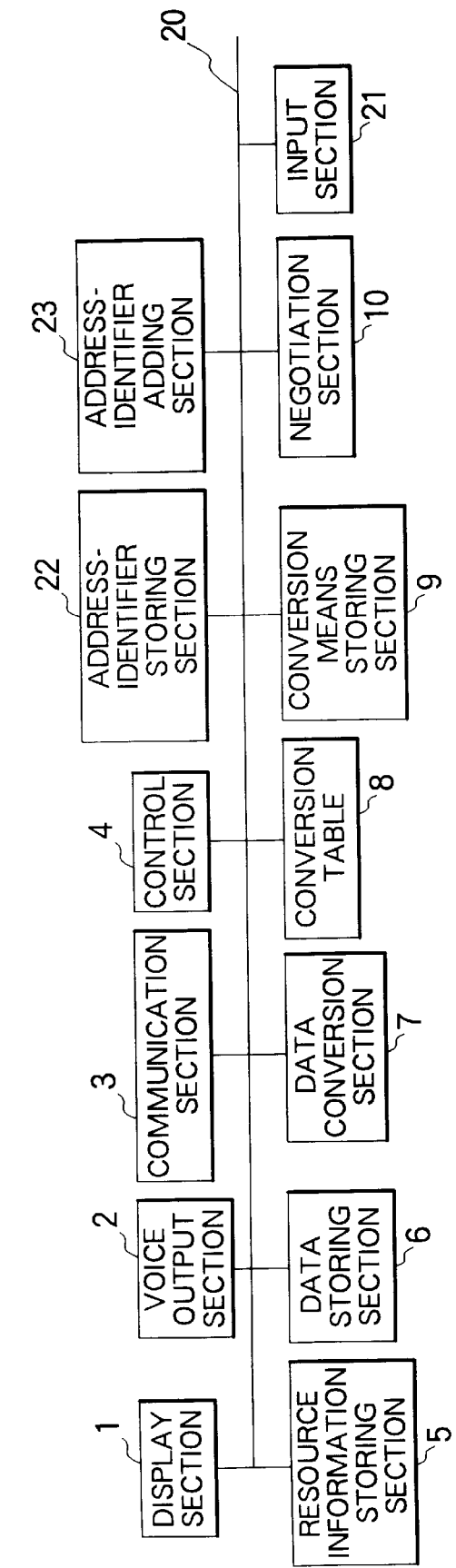
FIG. 6 is a block diagram showing a third embodiment of the communication equipment according to the present invention.

The communication equipment of this embodiment is provided with an address-identifier storing section 22 as original-address storing means for storing where original data is with respect to previously received data and an address-identifier adding section 23 as original-address adding means for adding an address of equipment on a sending side and an identifier for specifying data to current data to be transmitted, as shown in FIG. 6. The address-identifier storing section 22 is constructed so that, when currently stored data is exactly the same as the original data or the original data can be restored by some conversion, nothing is stored.

Figure 7:
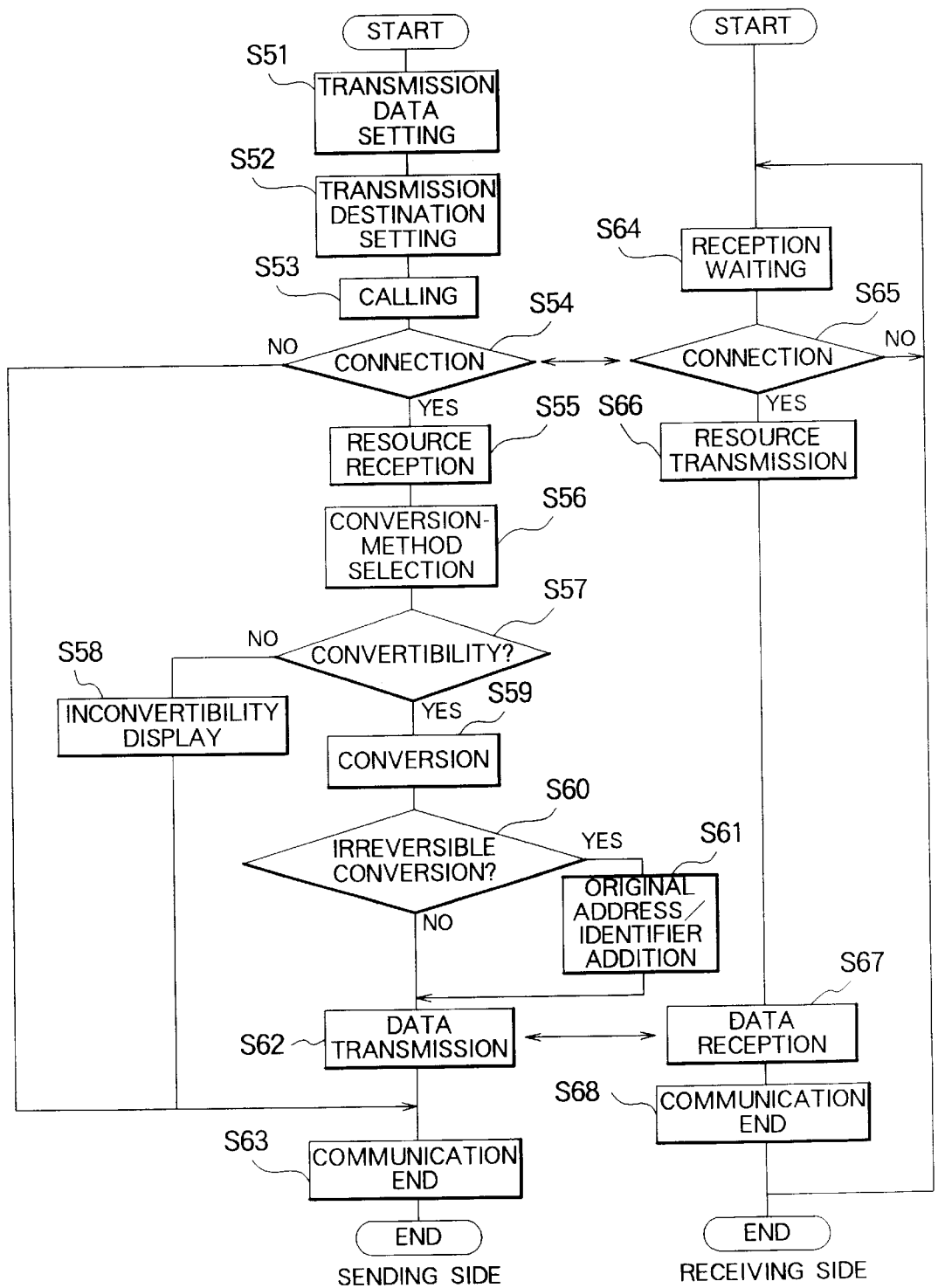
FIG. 7 is a flowchart showing the operation of the third embodiment of the communication equipment.

Now, the operation of this embodiment will be described along a flowchart of FIG. 7.

In step S51 transmission data is set and in step S52 a destination of transmission is set. In step S53 a transmission request is sent to the other party of transmission that was set in step S52, and in step S54 whether the connection is successful is judged. If the connection fails, in step S63 the communication will be ended. If the connection is successful, in step S55 the resource information that a terminal of the other party of transmission has will be received. In step S56 a conversion method is selected by an input section 21 in reference to a conversion table 8. In step S57 whether there is the selected conversion method is judged. Of course, even when data does not need to be converted, the data is judged as being convertible. If there is not the selected conversion method, in step S58 that effect will be informed to the user and in step S63 the communication will be ended. In this case the communication ends, but when different formats are used in one data, for example, when characters and still images exist together, some of them (for example, only characters) can be transmitted. In such a case, the communication does not end and only what can be transmitted may be transmitted. If there is the selected conversion method, in step S59 the data will be converted. In step S60 whether the conversion in step S59 is a reversible conversion or an irreversible conversion is judged. If the conversion in step S59 is an irreversible conversion, in step S61 the original address of the data and data identifier will be added to transmission data.

Note that the judgment of whether the conversion in step S59 is a reversible conversion or an irreversible conversion is stated in the conversion table of Table 4 in advance. In this way, the judgment can be realized. The address is a communication address for accessing equipment which has the original data before conversion. The identifier is a code for specifying which of data of the equipment the original data is. In a normal file system, the code may consist of a directory path and a file name. But, when the code is constituted only by a directory path and a file name, it cannot be found only by changing the file name. Therefore, it is desirable that a code such as always matching with data be adopted. Also, it is desirable that the format information of the original data be added at the same time. In step S62 the converted data is transmitted and in step S63 the communication is ended.

On the other hand, in the receiving side, in step S64 the transmission request waits for a chance for data to be accepted. In step S65 the transmission request is accepted and whether the connection was established is determined. When the connection is not established, the transmission request waits for a chance again for data to be accepted. When the connection is established, in step S66 the resource information that the receiving side equipment has is transmitted. In step 67 data is received and in step 68 the communication is ended.

The present invention is applied, for example, as follows. Suppose there are three kinds of equipment A, B, and C. The equipment A and C are the same in ability and are, for example, personal computers. The equipment B is inferior in performance to the equipment A and C and is, for example, a portable terminal. Data X exists in the equipment A. When the data X is sent from the equipment A to the equipment B, the data X is converted to a format different from this data X by the equipment A or B because the equipment B does not have an ability to interpret the data X. Let the converted data be data X'. Assuming the conversion performed here is an irreversible conversion, then an address of the equipment A holding the original data X and an identifier for specifying the original data X in the equipment A are added according to the present invention to the converted data X'. In the equipment B, the converted data X' is interpreted and an output (display) is performed. Furthermore, assume that the equipment B transmits the converted data X' to the equipment C. When the equipment C has an ability to interpret both the converted data X' and the format of the original data X, there is the possibility that a user desires to have the original data X rather than the converted data X where part of information has been lost. In such a case, since the data X' includes the address of the equipment A where the data X exists and also the identifier specifying the data X by the present invention, the equipment C can request the equipment A to send the data X. For example, this is a case such that the data X is a color image compressed by JPEG and the data X' is black-and-white bit map data. In the equipment C, when the data X is output, it is desirable that the effect that another original data exists is displayed at the same time and also the equipment C can communicate with the equipment A by a quick operation and output original data. Also, while it has been described in this example that only a single original address is added, addresses of all equipment through which data has passed as a history of transmission may be added. For electronic mail of an internet, the addresses of computers which have been passed are all added to the electronic mail.

In the aforementioned description, original data cannot be obtained if the data is irreversibly converted and deleted in the equipment which transmitted the data, but if transmission histories are all added, data could be requested of other equipment even if the data were deleted. Also, even in the case of irreversible conversion, the original data before conversion may be transmitted together with the data after conversion. In this case, the amount of data is increased, but since original data is stored at all times, there is no need to perform new communication when the original data is needed.

Now, a fourth embodiment of the communication equipment will be described while referring to the accompanying drawings.

The feature of the communication equipment of this embodiment is to constitute the conversion table 8 and the conversion-means storing section 9 of FIG. 1 by a writable medium. With this, even if a new format was generated, means converting a new format to an existing interpretable format could be added later and this embodiment could cope with a new format.

Now, a fifth embodiment of the communication equipment will be described while referring to the accompanying drawings. Note that the same reference numerals will be applied to the same constitutional parts as FIG. 1 and therefore a description is omitted.

Figure 8:
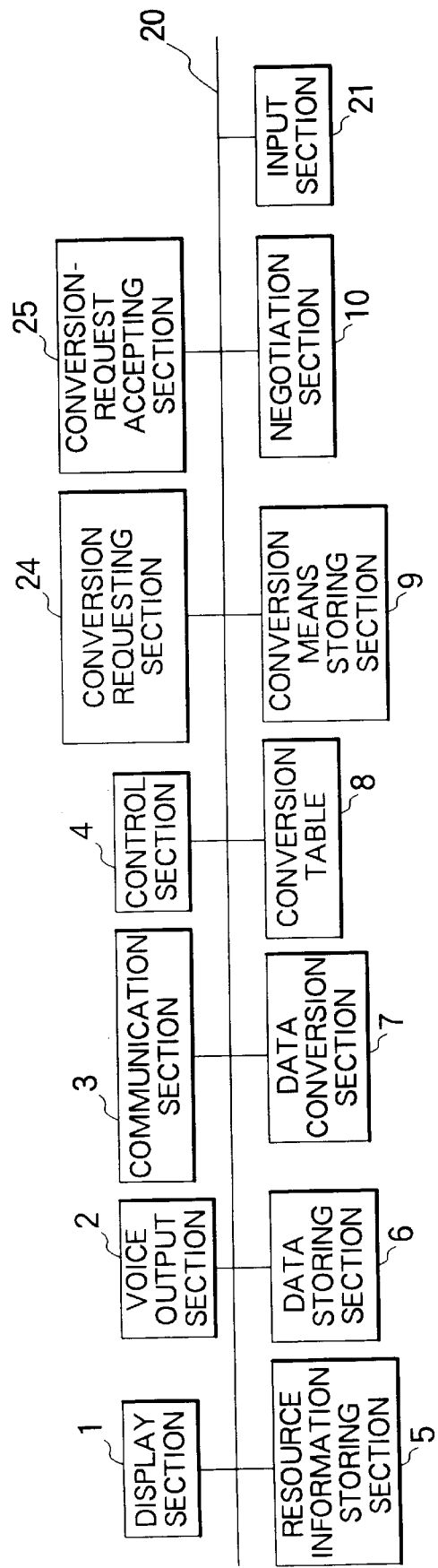
FIG. 8 is a block diagram showing a fifth embodiment of the communication equipment.

The communication equipment of this embodiment is provided with a conversion requesting section 24 as conversion requesting means for requesting format conversion of a third equipment and a conversion- request accepting section 25 as conversion accepting means for accepting a conversion request, as shown in FIG. 8.

Figure 9:
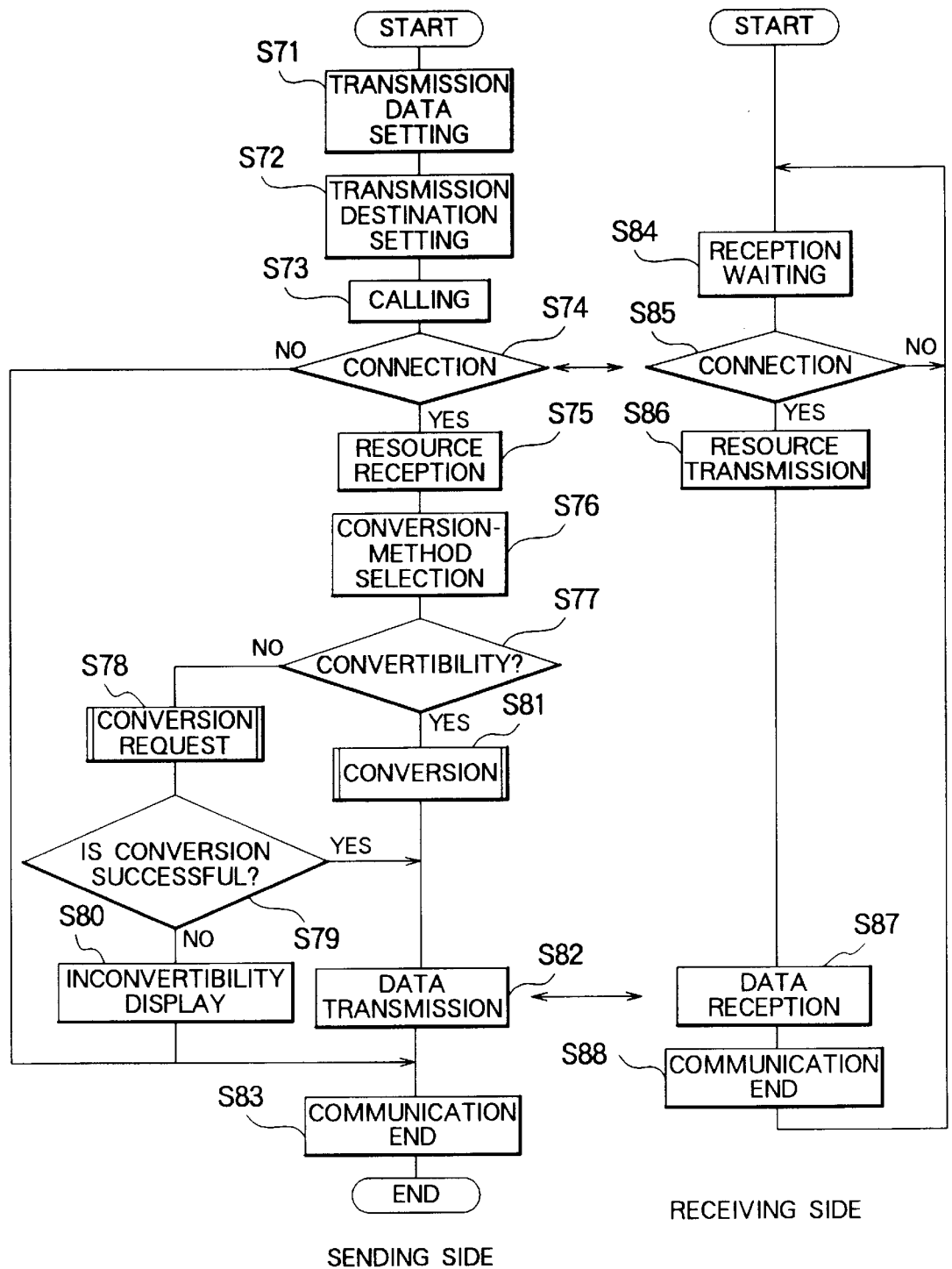
FIG. 9 is a flowchart showing the operation of the fifth embodiment of the communication equipment.

Now, the operation of this embodiment will be described along a flowchart of FIG. 9.

In step S71 transmission data is set and in step S72 a destination of transmission is set. In step S73 a transmission request is sent to the other party of transmission that was set in step S72, and in step S74 whether the connection is successful is judged. If the connection fails, in step S83 the communication will be ended. If the connection is successful, in step S75 the resource information that a terminal of the other party of transmission has will be received. In step S76 a conversion table 8 is referred to and a conversion method is selected by an input section 21. In step S77 whether there is the selected conversion method is judged. Of course, even when data does not need to be converted, the data is judged as being convertible. If the transmitting and receiving sides do not have the selected conversion method, in step S78 the conversion will be requested of a third equipment. This request will be described later. In step S79 whether the conversion request is successful is judged. If the conversion fails, in step S80 a display of inconvertibility will be output and in step S83 the communication will be ended. If the performance evaluation value of the machine type on the sending side is high, in step S81 the data will be converted in the sending side so that it can be interpreted by the receiving side. When conversion is unnecessary, nothing is done. In step S82 the converted data is transmitted and in step S83 the communication is ended.

On the other hand, in the receiving side, in step S84 the transmission request waits for a chance for data to be accepted. In step S85 the transmission request is accepted and whether the connection was established is determined. When the connection is not established, the transmission request waits for a chance again for data to be accepted. When the connection is established, in step S86 the resource information that the receiving side equipment has is transmitted. In step 87 the data in the form that the receiving side can interpret is received. In step S88 the communication is ended.

Figure 10:
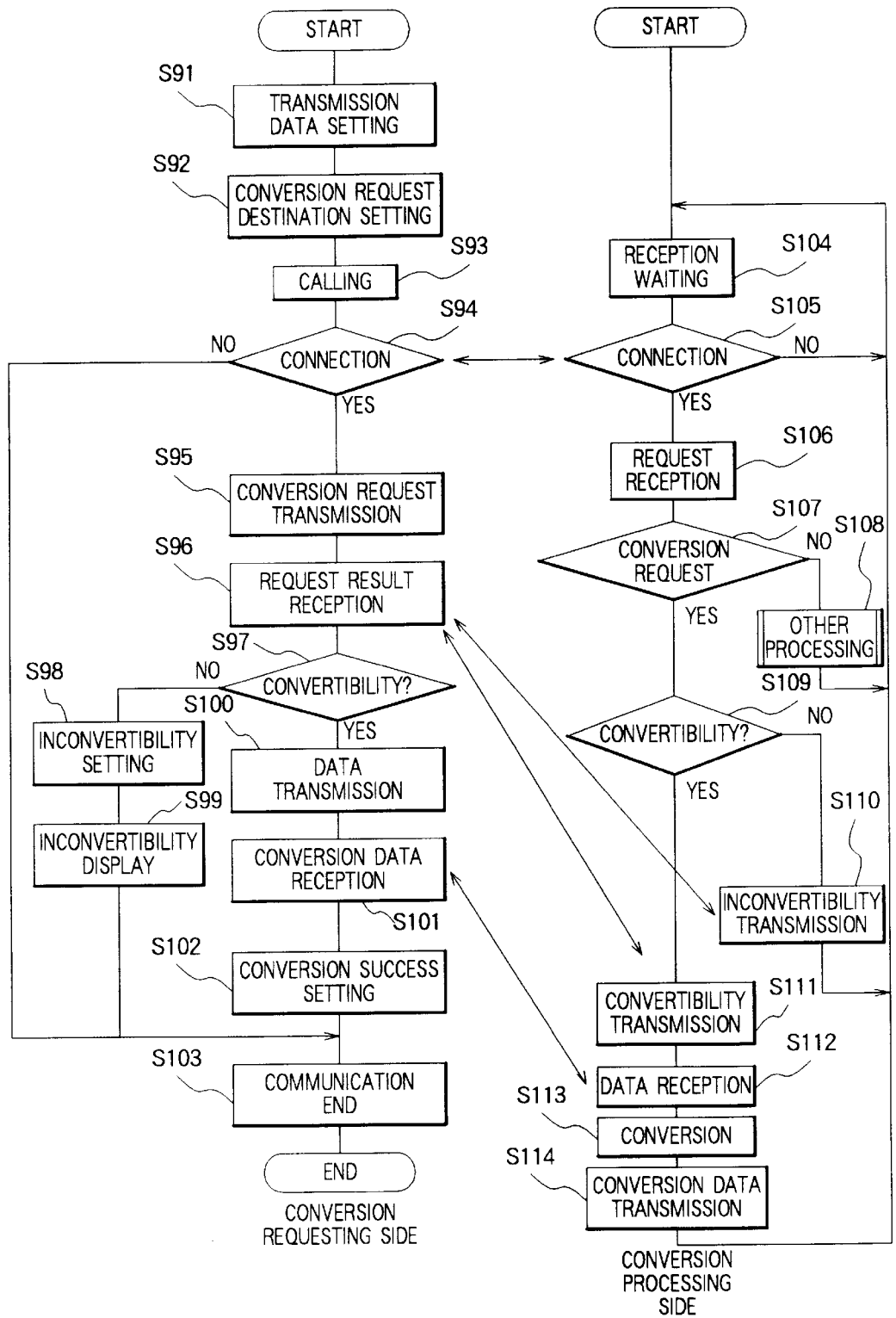
FIG. 10 is a flowchart showing the operation of the fifth embodiment of the communication equipment.

Now, the conversion request in step S78 will be described along a flowchart of FIG. 10.

In step S91 transmission data is set and in step S92 a destination of the conversion request is set. In step S93 the destination of the conversion request is called. In step S94 whether the connection is successful is judged. In step S95 the conversion request is transmitted. The conversion request states the format before conversion and the format after conversion. In step S96 the result of whether a terminal of the destination can perform the requested conversion is received. In step S97 whether the conversion is possible is determined. In step S98 inconvertibility is set as a result of the conversion request. In step S99 the inconvertibility is displayed and in step S103 the communication is ended. Also, when in the aforementioned step S97 the conversion is determined to be possible, in step S100 data for conversion is transmitted. In step S101, the converted data is received. In step S102, a success of conversion is set as a result of the conversion request. In step S103 the communication is ended.

On the other hand, in the receiving side, in step S104 the transmission request from other equipment waits for a chance for data to be accepted. In step S105 whether the communication was established is determined. In step S106 the request of a sender is received. In step S107 whether the reception request is a conversion request is determined. When the reception request is a request other than a conversion request, in step S108 predetermined other processing is performed. In step S109 whether the transmitted conversion request is possible is judged. When the request is judged to be inconvertible, in step S110 the inconvertibility is sent. In step S111 convertibility is sent. In step S112 data for conversion is received. In step S113 conversion processing is actually performed. In step S114 the converted data is sent.

Note that, while in the aforementioned flow a conversion request has been output to another equipment in the middle of the process of transmission, of course it is desirable that the conversion request be output to another equipment after the first communication is interrupted once and then the first other party of transmission be again called out after conversion. For example, in a case where data is transmitted and received between two portable terminals different in type of machine, when the portable terminals themselves do not have a means of conversion, a conversion request is output according to the present invention to a third equipment, for example, a personal computer in order to perform conversion. In the aforementioned flow, the equipment on the sending side receives a result of conversion result after sending a conversion request and then the conversion result is sent to the receiving equipment. But, of course, equipment performing conversion may send the conversion result directly to the receiving side without sending the conversion result back to the sending side. In this case, when the conversion request or data is transmitted, it is necessary to send the address of a transmission destination to the equipment on the converting side at the same time. Also, it is desirable to convert a plurality of data by a single conversion request or to output a conversion request to a plurality of equipment rather than a single set of equipment.

Now, a sixth embodiment of the communication equipment will be described while referring to the accompanying drawings. Note that the same reference numerals will be applied to the same constitutional parts as FIG. 1 and therefore a description is omitted.

Figure 11:
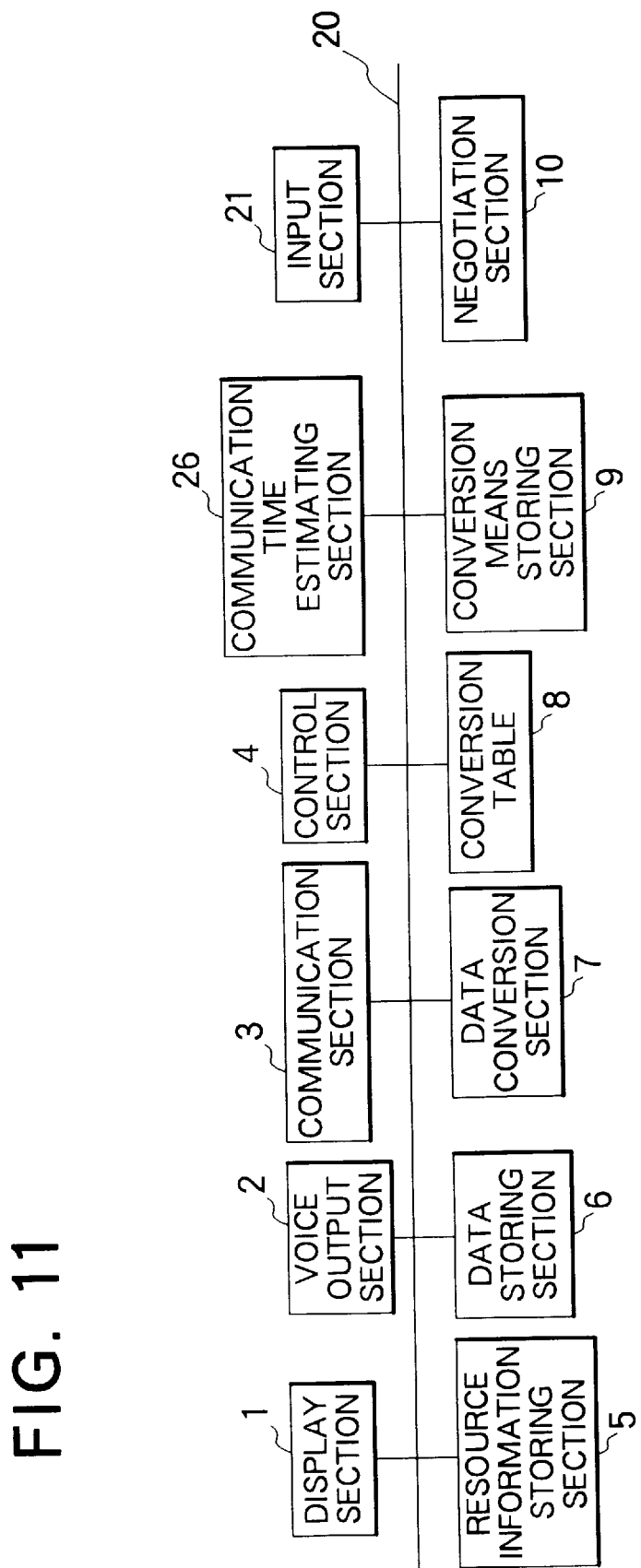
FIG. 11 is a block diagram showing a sixth embodiment of the communication equipment.

The communication equipment of this embodiment is provided with a communication time estimating section 26 as communication time estimating means for estimating a communication time, including a data converting time, as shown in FIG. 11.

Figure 12:
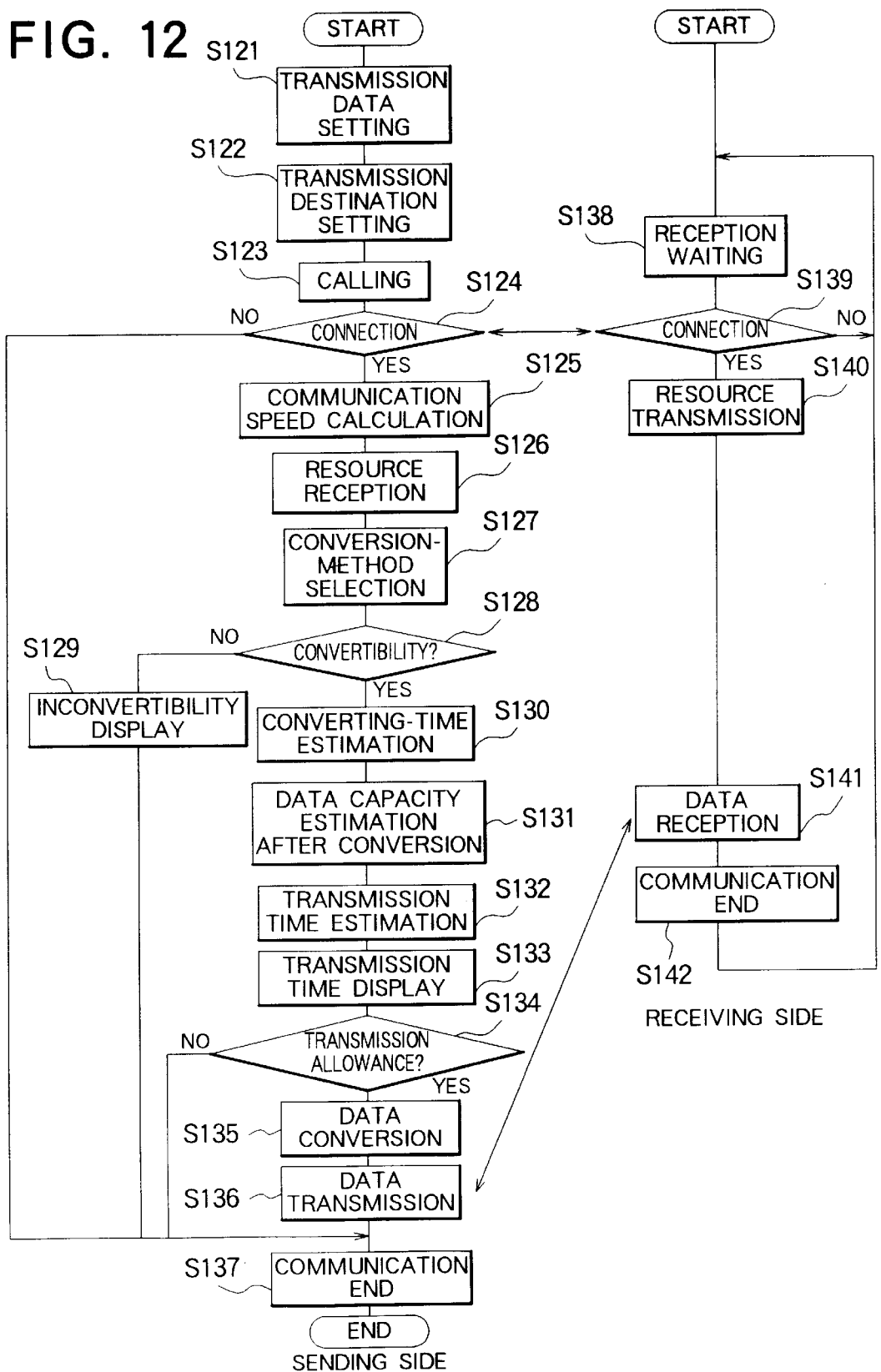
FIG. 12 is a flowchart showing the operation of the sixth embodiment of the communication equipment.

Now, the operation of this embodiment will be described along a flowchart of FIG. 12.

In step S121 transmission data is set and in step S122 a destination of transmission is set. In step S123 a transmission request is sent to the other party of transmission that was set in step S122, and in step S124 whether the connection is successful is judged. If the connection fails, in step S137 the communication will be ended. If the connection is successful, in step S125 a communication speed will be obtained. This is because the communication speed often changes depending upon the state of a line. In a modem, the communication speed is determined by normal training. Therefore, the rough estimation of the communication speed can be calculated after the training. But, since an error rate is not known completely, the communication speed becomes a roughly estimated numerical value. In step 126 the resource information that the other party of the transmission has is received. In step S127 a conversion table 8 is referred to and a conversion method is selected by an input section 21. In step S128 whether there is the selected conversion method is judged. Of course, even when data does not need to be converted, the data is judged as being convertible. In step S129 inconvertibility is displayed and in step S137 the communication will be ended. When data is judged to be convertible, in step S130 the time needed for conversion is estimated. Even in this case, a complete estimation is difficult depending upon the kind of a conversion method or data. Therefore, in the case of standard data size, the time needed for conversion is estimated by a numerical value previously stored for each conversion method and a method estimated from the amount of current data. In step S131 the data capacity after conversion is estimated. As with step S130, a complete estimation is difficult, but the rough value of the data capacity can be obtained from a standard numerical value by a rough estimation. In step S132 the rough estimation of the time needed for current data communication is obtained by an equation such as "data capacity after conversion/communication speed +conversion time." Also, if billing information is stored, it will be possible to present the rough estimation of a communication fee needed for communication to users.

In step S133 the needed time obtained in step S132 is displayed, and the user can confirm whether the data is allowed to be sent. In step S134 whether the user allowed the data to be sent is judged. When the data is allowed to be sent, in step S135 the data is converted. In step S136 the converted data is transmitted and in step S137 the communication is ended.

On the other hand, in the receiving side, in step S138 the transmission request waits for a chance for data to be accepted. In step S139 the transmission request is accepted and whether the connection was established is determined. When the connection is not established, the transmission request waits for a chance again for data to be accepted. When the connection is established, in step S140 the resource information that the receiving side equipment has is transmitted. In step S141 the data in the form that the receiving side can interpret is received. In step S142 the communication is ended.

Note that, when a plurality of conversion methods exists, it is desirable to display all or some of them so that a user can select one of them. When transmission data includes data different in kind, such as character and image data, only information for obtaining original data may be sent. For example, when a user tries to send data including characters and a dynamic image by way of a telephone line but determines that it takes too much time to send a dynamic image via a telephone line, information on the characters can be all transmitted and only an identifier of the dynamic image, which is address information for obtaining original data, can be sent. Note that, if in this case the positional relationship (coordinate information) between the characters and the image is sent together, at which position the image displayed can be displayed to a user when the characters are displayed. Also, in accordance with the aforementioned embodiment of claim 3, when a dynamic image is desired, the data is obtained by sending a transmission request. When a determination is required of a user, it is possible to state conditions in advance. In this case, it is possible for a user to set, for example, "Communication is not performed more than 10 minutes" or "Communication of more than ¥100 is not performed" in advance and select conversion meeting the conditions to perform communication. Also, when data, including characters, images and music, is transmitted, it is desirable to first send what is smaller in amount of data.

From experience, character data is small in amount of data and large in amount of information per unit (byte), as compared to image data. Therefore, by first sending what is small in amount of data, when communication is interrupted, the possibility that a great amount of information has arrived is high. Also, since demands such that image data is important depending upon usage are often different depending upon users, it is desirable that which data a user can send first can be set.

Now, a seventh embodiment of the communication equipment will be described while referring to the accompanying drawings. Note that the same reference numerals will be applied to the same constitutional parts as FIG. 1 and therefore a description is omitted.

Figure 13:
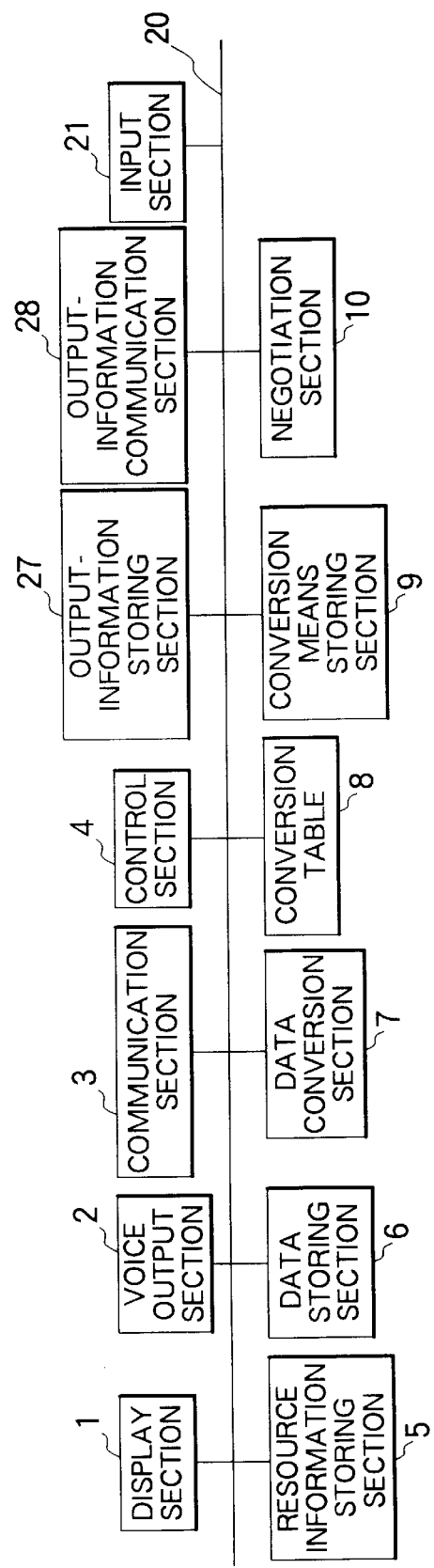
FIG. 13 is a block diagram showing a seventh embodiment of the communication equipment.

The communication equipment of this embodiment is provided with an output-information storing section 27 as output-information storing means for storing information (for example, output software) for outputting or processing data and an output-information communication section 28 as output-information communication means for sending the information stored in the output-information storing section 27 to another equipment or obtaining output information from another equipment, as shown in FIG. 13. Note that in the aforementioned embodiments the output-information storing section 27 exists as part of the display section or voice processing section.

Figure 14:
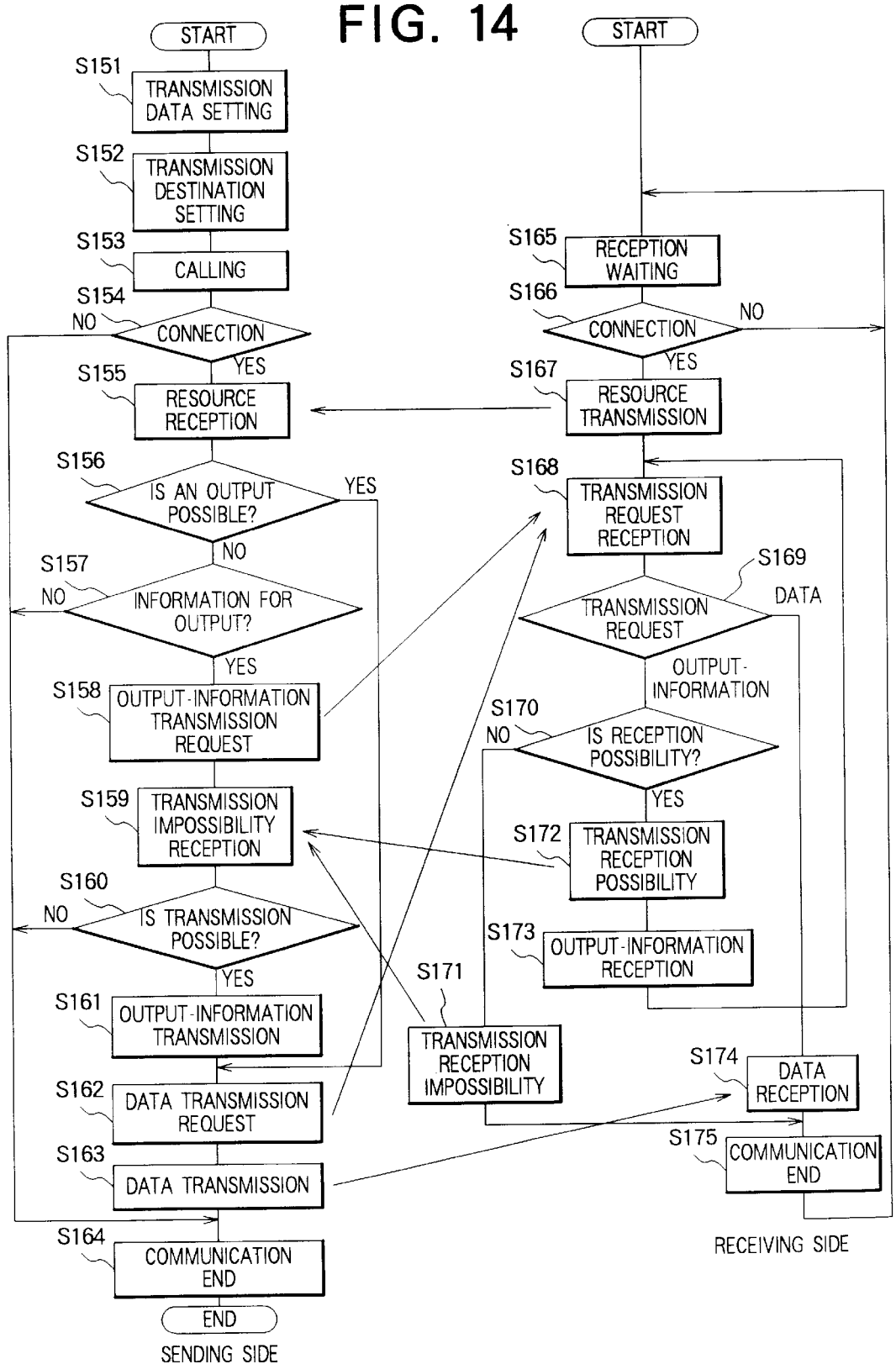
FIG. 14 is a flowchart showing the operation of the seventh embodiment of the communication equipment.

Now, the operation of this embodiment will be described along a flowchart of FIG. 14.

In step S151 transmission data is set and in step S152 a destination of transmission is set. In step S153 a transmission request is sent to the other party of transmission that was set in step S152, and in step S154 whether the connection is successful is judged. If the connection fails, in step S164 the communication will be ended. If the connection is successful, in step S155 the resource information that a terminal of the other party of transmission has is received. In this case, assume that the machine-kind of a receiving equipment has been stored in the resource information. In step S156 whether the data can be output or processed by the receiving equipment is judged with the resource information. When the receiving terminal cannot output data, in step S157 whether output information for a receiving equipment has been stored in the sending side is judged because the receiving side cannot output data. This judgment makes use of the machine-kind information of the resource information. When the sending side is judged to have stored the output information for a receiving terminal, in step S158 a transmission request of the output information is transmitted to the receiving equipment. In step S159 whether transmission is possible is received. In step S160 whether transmission is possible is judged. When transmission is judged to be possible, in step S161 the output information is transmitted. In step S162 data transmission is requested. In step S163 data is transmitted and in step S164 the communication is ended.

On the other hand, in the receiving side, in step S165 the transmission request waits for a chance for data to be accepted. In step S166 the transmission request is accepted and whether the connection was established is determined. When the connection is not established, the transmission request waits for a chance again for data to be accepted. When the connection is established, in step S167 the resource information that the receiving side equipment has is transmitted. In step S168 the transmission request is received. In step S169 whether the transmission request is a request for data or a request for output information is judged. When the request is judged to be a request for output information, in step S170 whether the output information is received is judged. This may be judged, for example, by a memory capacity or this can also be realized by inquiring of a user if the output information is received. When reception is judged to be impossible, in step S171 the impossibility of the reception is transmitted. When reception is judged to be possible, in step S172 the possibility of the reception is transmitted. In step S173 the output information is received.

When in the aforementioned step S169 the transmission request is judged to be a request for data, in step S174 data is received. In step S175 the communication is ended.

For now assume that the sending side wants to send data X but the receiving side has no information for outputting or processing the data X. In this case, if the present invention is used, then the information for outputting the data X can be automatically sent from the equipment on the sending side to the receiving side and therefore the data can be output without preparing output information to the equipment on the receiving side in advance. For example, if information for outputting data at portable terminals are all stored in a single personal computer, software for outputting data will be automatically installed in portable terminals when the portable terminals receive data from the personal computer, without requiring the portable terminals to install the output software individually. Since the problem of a copyright occurs here, a copy enable flag or a copy inhibit flag is set on information for output and only the output information with a copy enable flag is copied. Also, a copy inhibit flag may be set on software copied once to prevent it from being copied again.

In accordance with the aforementioned communication equipment of first embodiment, the hardware and software information (resource information) that communication equipment has is sent prior to data communication, and the data format of current data communication is compared with the resource information of the receiving side. When data conversion is necessary, data is transmitted after data conversion. Therefore, even if data formats were different, data communication could be performed.

For example, assume that a portable terminal and a personal computer are interconnected via a public telephone line. Also assume that the music the personal computer has is an MIDI format and the portable terminal cannot interpret the MIDI data format and can output only a WAVE format. Even in this case, the respective resources are judged according to the present invention, and data can be sent after the MIDI format is converted to the WAVE format at the personal computer side (or portable terminal side).

Likewise, even in a case where the schedule data format the personal computer has is different from that of the portable terminal, the present invention will automatically judge which format the respective machines can handle, if a conversion program is prepared. Accordingly, users are able to transmit and receive data without being conscious of the conversion.

In accordance with the aforementioned communication equipment of second embodiment, in a case where both the sending side and the receiving side have an ability of conversion when conversion is performed, the communication time, including the conversion, can be shortened because the operational performances of equipment are compared and conversion is performed by the equipment whose performance is better. In the aforementioned example of first embodiment, whether conversion is performed at the personal computer side or the portable terminal side depends upon a mounting method. For example, when the conversion is much slower at the portable terminal side than at the personal computer side, performing the conversion at the portable terminal side is bad in conversion efficiency. Therefore, in the present invention, the conversion performance at the personal computer side and the conversion performance at the portable terminal side are compared to perform conversion at the side having a better performance.

In accordance with the aforementioned communication equipment of third embodiment, in a case where part of original data is lost due to conversion, the original data can be readily obtained by finding and sending information on where the original data exists. In the aforementioned example of second embodiment, when the MIDI format is converted to the WAVE format, it is impossible to restore the MIDI format. This is because, even if an image were further sent to another personal computer when the portable terminal has a WAVE format, the personal computer would not have an MIDI format.

If the present invention is used, both the WAVE format and the original MIDI format will be held, or information on where the original MIDI format exists will be held. Therefore, even in a case where the original MIDI format is desired, it can be readily called out with a simple operation.

In accordance with the aforementioned communication equipment of fourth embodiment, the resource information is stored in a writable memory medium. With this, resource information can be readily added by addition of a new peripheral equipment or new software.

In accordance with the aforementioned communication equipment of fifth embodiment, the format conversion that the sending and receiving equipments cannot perform can be performed because the present invention has a function requesting data conversion of a third equipment. In a case where, in the aforementioned example of first embodiment, neither the personal computer on the sending side nor the portable terminal on the receiving side can perform the conversion from MIDI to WAVE, data conversion can be made by use of the third equipment (for example, work station or personal computer). Format conversion is automatically requested of the third equipment and therefore users can transmit and receive data without being conscious of format conversion.

In accordance with the aforementioned communication equipment of sixth embodiment, in a case where a plurality of kinds of conversions exist, an estimated value of the communication time for each conversion is presented to users prior to conversion. With this, users are able to select an appropriate conversion method.

In accordance with the aforementioned communication equipment of seventh embodiment, in a case where the receiving side does not hold information such as software for processing data, data can be processed without conversion, because the information can be obtained from the sending side.

Then the description is directed to embodiments of the terminal equipment of the present invention.

A first embodiment of the terminal equipment of the present invention will hereinafter be described while referring to the accompanying drawings.

Figure 15:
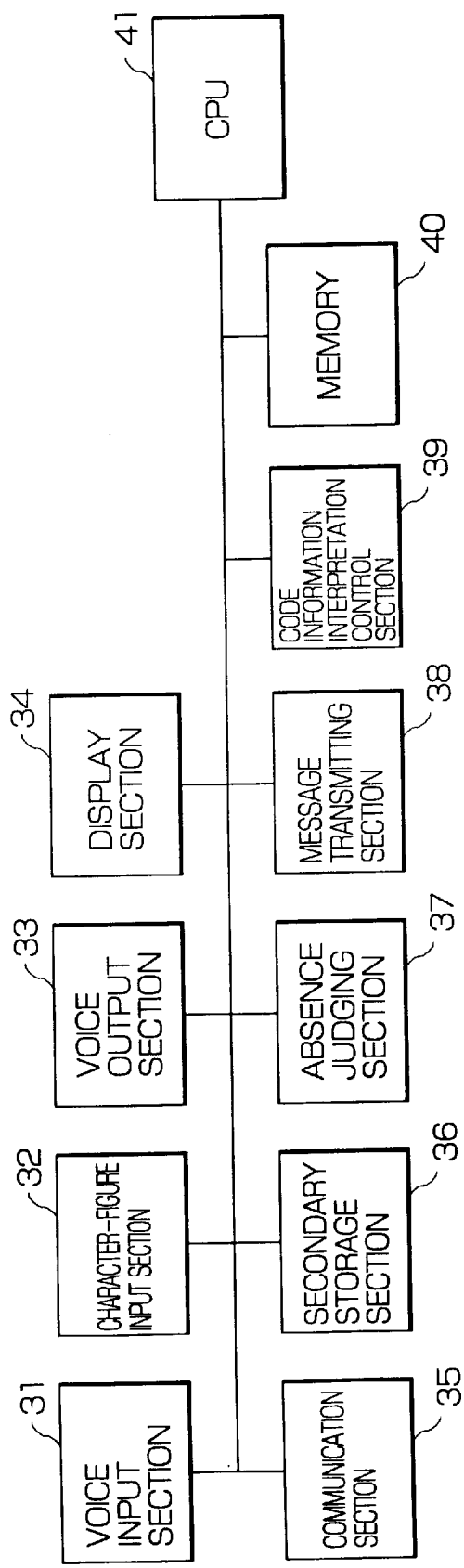
FIG. 15 is a block diagram showing a first embodiment of the terminal equipment of the present invention.

The terminal equipment of this embodiment, as shown in FIG. 15, comprises a voice input section 31 for inputting voice, a character-figure input section 32 for inputting characters and figures, a voice output section 33 for outputting a sent voice, a self-voice, or a synthesized sound from a terminal, and a display section 34 as display means for displaying sent characters, figures, and code data, a message from a terminal, or characters input by a user. The terminal equipment further comprises a communication section 35 for transmitting and receiving the voice, characters, and figures which were input by the user and the data or command prescored in a terminal, a secondary storage section 36 as secondary storage means for storing the messages at the time of absence, the address data of a sender, a history of transmissions and receptions, an absence judging section 37 as absence judging means for judging that a user is absent, and a message transmitting section 38 as message transmitting means for transmitting a message consisting of a data part such as voice, figures, and characters, which is presented to a user on a receiving side, and a code part serving as a sort of program controlling a terminal on a receiving side. The terminal equipment further comprises a code information interpretation control section 39 as code information control means which, when a message generated by the message transmitting section of some other terminal is received, interprets the code contained in the message, presents the data to a user, and controls the terminal, a memory 40 for storing information that is used in an operation, and a central processing unit (CPU) 41 for controlling the overall operation of the equipment.

While an analog public line, ISDN, and LAN exist as a line for performing communication, in this embodiment the kind doesn't matter. In the judgment of the absence judging section 37, for example, a user can set an absence mode to a terminal in addition to the judgment that absence will be judged if a calling sound rings five times. Also, in interlock with personal schedule data the time of the conference on the schedule can be automatically set to an absence mode and a response of an absence can be output with respect to a transmission request. The message which is output by the message transmitting section 38 is not only transmitted when the other party is absent, but also serves as a message of an electronic mail with a control function.

Figure 16:
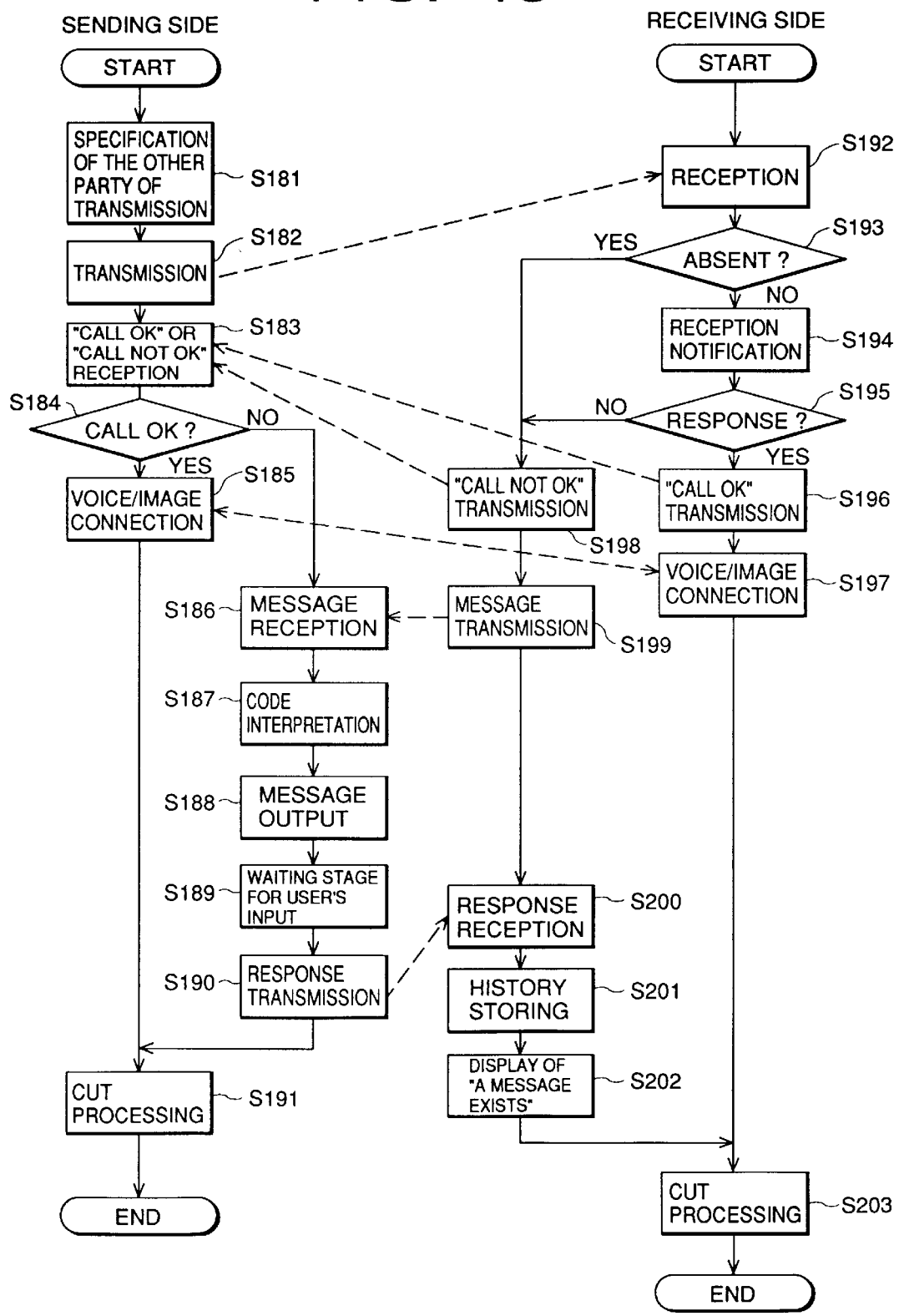
FIG. 16 is a first flowchart showing the operation of the first embodiment.

Now, the operation of this embodiment will be described with a flowchart of FIG. 16. In the figure, the left side shows the flow of the terminal on a transmitting side and the right side shows the flow of the terminal on a receiving side.

First the flow on the transmitting side will be described. The other party of the transmission is first specified (step S181). The specification of the other party may be done by specifying a telephone number or specifying an address book displayed on a display with a pen. Next an actual communication with the other party is performed by the communication section 35 (step S182). On a telephone, the connection with the telephone of the other party is established via an exchange, and on electric mail, the communication path with the computer of the other party is established. Then, the code of "Call OK" or "Call not OK", transmitted from the terminal of the other party of a call, is received (step S183). The "Call OK" is the state where a sender can directly make a call to the other party, and the "Call not OK" is the state where a sender cannot make a call to the other party. The code information interpretation control section 39 checks whether the "Call OK" was sent or not (step S184). If "OK," a connection of voice or image will made just as a normal telephone or a television telephone will be connected (step 185) and a normal call will become possible. Of course, code information such as characters may be transmitted and received. When "Call not OK" is received, a message from a receiving side is received (step S186). This message is such, for example, as "Ueda is now out," and includes a code controlling a terminal which received the absence message. The code contained in the received message is interpreted by the code information interpretation control section 39, and the terminal is operated according to the interpretation (step S187). The code is interpreted and a message which is presented to a user is output as needed (step S188). Then, there becomes a waiting state for an input from a user (step S189). This means waiting for a user to click "YES" with a mouse, for example, when "Do you leave some message?" is displayed in step S188. But when an input from a user is not expected by the code interpretation in step S187, there are some cases where this part is omitted. Also, when a plurality of user's inputs are needed by the code interpretation, there are also some cases where loop processing between step S187 and step S189 or between step S188 and step S189 is performed such that a different message is output by a user's input and then a user's input is again performed with respect to the message. If the user's input is completed, a response corresponding to that will be transmitted (step S190). This response, as with the absence message, also consists of data and control commands. If the foregoing is completed, cut processing for completing communication will be performed (step S191). Next the flow of the receiving side will be described. A calling signal is first received and a communication line is established by the communication section 35 (step S192). The absence judging section 37 then judges if the user of the terminal on the receiving side is absent (step S193). In this embodiment it is judged whether the mode of the terminal has already been shifted to an absence mode representative of absence. And, when there is not the absence mode, the user is notified of a call request by ringing a calling sound (step S194), and whether there is a response is judged (step S195). When there is a response, the code of "Call OK" is sent (step S196) and the voice or image connection between users is made (step S197). When a user is absent or there is no response, "Call not OK" is sent (step S198) and an absence message previously stored is sent by means of the message transmitting section 38 (step S199). After the transmission of the absence message, a response from the other party is received (step S200) and a history of calls is stored in the secondary storage section 36 (step S201). After the storage of the history, the effect that a message exists is displayed on the display section 34 of the terminal on the receiving side (step S202). If the foregoing processing is completed, cut processing of a communication line will be performed (step S203). Note that after the message transmission in step S199, the communication line may be cut immediately, and at the time of the response transmission in step S190 the other party may be called again and electronic mail may be sent.

Figure 17:
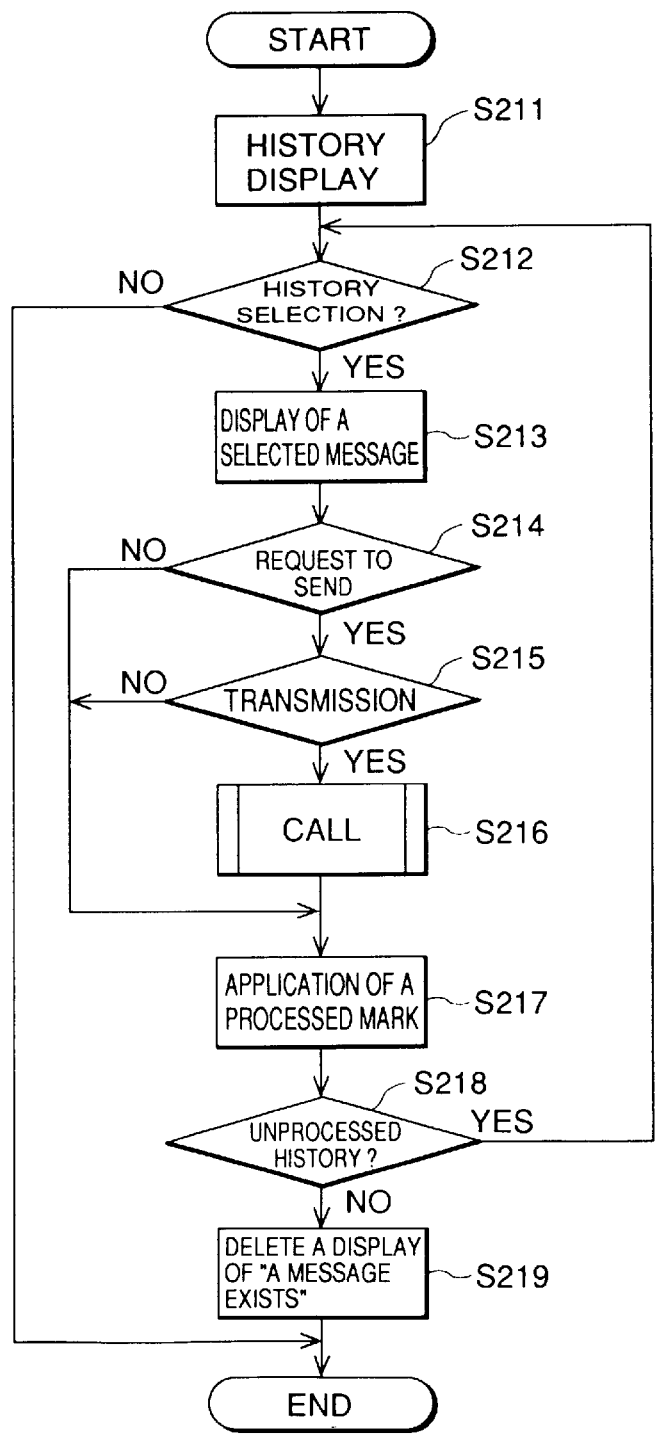
FIG. 17 is a second flowchart showing the operation of the first embodiment.

A case where a user views the messages left in the terminal will hereinafter be described while referring to a flowchart of FIG. 17. The flowchart shown in FIG. 17 shows the flow after the mode of the terminal has been shifted to a mode displaying messages left. First, history information such that from whom and at what time messages were left is called from the secondary storage section 36 and displayed on the display section 34 in the form of a list (step S211). Since it is possible in the ISDN to know the telephone number of the other party and store it in the secondary storage section 36, it is possible to know the other part from the telephone number or previously stored information. Likewise, since in the electronic mail on the LAN the address of the other party can also be obtained as a code, it is also possible to automatically know the information of the other party. Next the user selects a desired message from the message list (step S212). If the user now selects "END", the mode displaying messages will be completed. If "History" is selected, messages corresponding to it will be displayed (step S213) and whether a request to send exists among the messages will be checked (step S214). If a request to send exists, a user will be inquired of whether transmission is performed (step S215). If the user inputs the effect that transmission is performed, a line will be automatically connected to a person who sent the request to send (step S216). The procedure of the call is the same as the flow on the above-mentioned sending side. In this embodiment a description has been made of the control of the automatic transmission, but if a command contained in a message can take a form of a sort of program, a sequence such that a description of a commodity can be automatically taken out or the order of a commodity can be automatically received can be put in addition to the selection of a transmission. If a call is completed, a mark meaning a message has already been processed will be applied to the history list (step S217). Whether an unprocessed message exists is judged in step S218. If an unprocessed message exists, then the operation will return to the history selection. If the processing of all histories is completed, then a message will be deleted (step S219) and this mode will be completed.

An example of the message displayed on the terminal on a sender side is shown in FIG. 18. In this case, besides the message, processing is selected from three kinds, "please telephone," "telephone later," and "leave a message." If the "leave a message" is selected, a mode inputting a message will be displayed as shown in FIG. 19. An example of a list of histories is shown in FIG. 20. The display or selection of FIG. 20 is controlled by the command contained in the received message. Of course, the routine on the display terminal side can be used for the display or the processing such as an actual input by a mouse. This example is a display of only characters, but it is desirable that voice, figures, or images be handled.

A second embodiment of the terminal equipment of the present invention will hereinafter be described while referring to the drawings.

Figure 34:
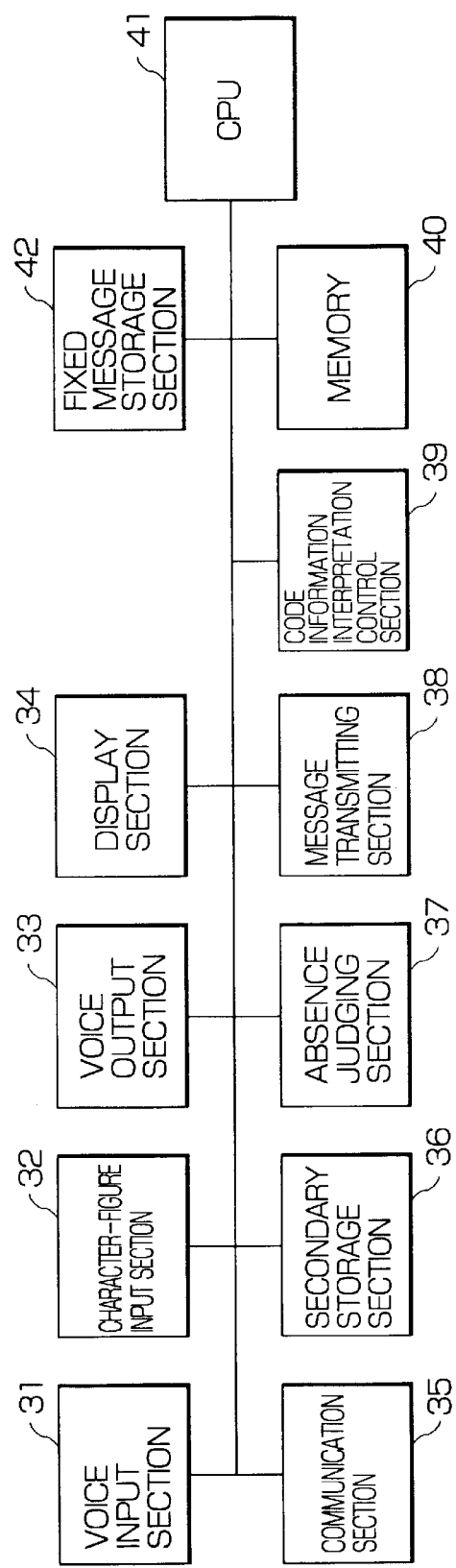
FIG. 34 is a block diagram showing the second embodiment of the terminal equipment of the present invention.

In the construction of this embodiment, a fixed message storage section 42 as fixed pattern storage means for storing a plurality of fixed absence message patterns is added to the construction of the first embodiment, as shown in FIG. 34.

Figures 21, 22:
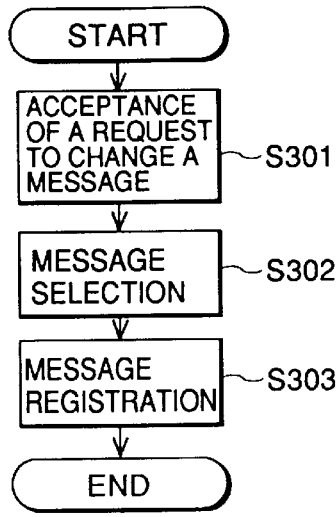
FIG. 21 is a flowchart showing the absence message storing operation in a second embodiment of the terminal equipment of the present invention.
FIGS. 22((a) and (b) are diagrams) showing an example of the absence message of the second embodiment.

Now, the operation storing an absence message by this embodiment will be described while referring to a flowchart of FIG. 21. In the state where a request to change a message is accepted (step S301), a user selects one of a plurality of absence messages (step S302). The selected message is then registered as an absence message (step S303). Two absence message examples are shown in FIGS. 22 (a) and 22 (b), and these examples have been previously stored. FIG. 22 (a) is an example of the type where one of "please telephone," "telephone later," and "leave a message" is selected. FIG. 22 (b) is an example of the type where a screen inputting a message first appears, and a previously registered user's name is displayed in the [Name] of the message screen. Note that when a telephone number, the mail address of the other party, or the name of the other party can be specified, a message can be selected according to the other party. For example, in the case of Mr. A the message of FIG. 22 (a) can be transmitted and in the other cases the message of FIG. 22 (b) can be transmitted.

A third embodiment of the terminal equipment of the present invention will hereinafter be described while referring to the drawings.

In the construction of this embodiment, a message editing section 43 as message making means for making a user's own message is added to the construction of the first embodiment, as shown in FIG. 35.

Figure 23:
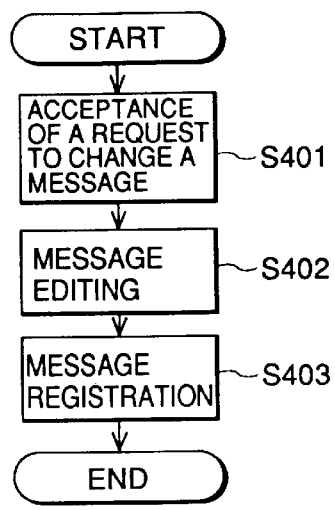
FIG. 23 is a flowchart showing the message making operation in a third embodiment of the terminal equipment of the present invention.
Figure 24:
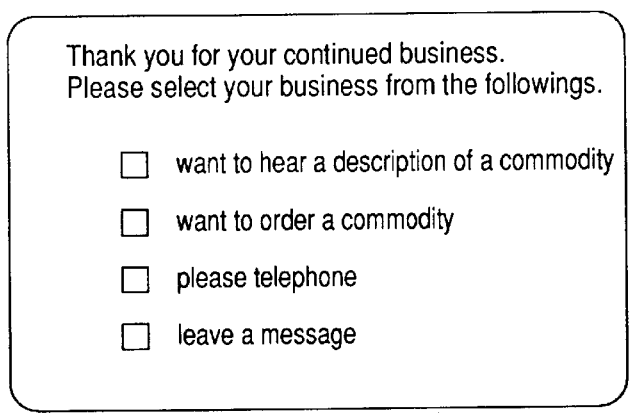
FIG. 24 is a diagram showing an example of the absence message made in the third embodiment.
Figure 25:
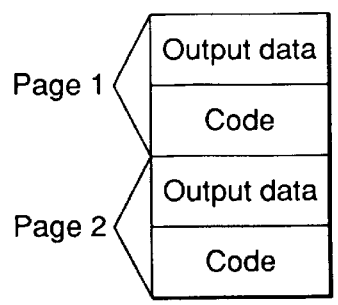
FIG. 25 is a diagram showing the structure of the absence message made in the third embodiment.

Now, the operation making a user's own message by this embodiment will be described while referring to FIG. 23. First, a request to change a message is accepted (step S401) and a message edit function is operated in order to make a user's own message (step S402). If the user's own message is completed, it will be registered as a new absence message (step S403). An example of the absence message made by this processing is shown in FIG. 24. This is an example of the message of mail order. For example, it is possible to make a tree structure so that when "want to order a commodity" is selected, a screen for ordering a commodity is next displayed. An example of the structure of the absence message is shown in FIG. 25. The absence message shown in this figure are collected at units of pages. It is desirable that the page match with a display unit such as that shown in FIG. 24. Each page consists of output data and a control code for the output data. The output data is data such as characters of, for example, "Thank you for your continued business.", figures, and voice. The code is a sort of program describing, for example, how processing will be performed if an item such as "please telephone" is selected. An example of codes written in program language is shown in FIG. 26. In this example, the processes, which are performed when there occurs an event such that a message was opened or that a box was selected by clicking a mouse, are mainly stated. This example indicates that, for example, if "box1" is pressed, then a code of "need tel" will be sent to the other party and page 2 will be displayed.

A fourth embodiment of the terminal equipment of the present invention will hereinafter be described while referring to the drawings. This embodiment has the same construction as any of the first to third embodiments described above and is provided with a function where transmission data and information requesting a call are sent to the other party at the same time, and when the other party receives the transmission data, a call with the other party is performed with a single operation.

Figure 27:
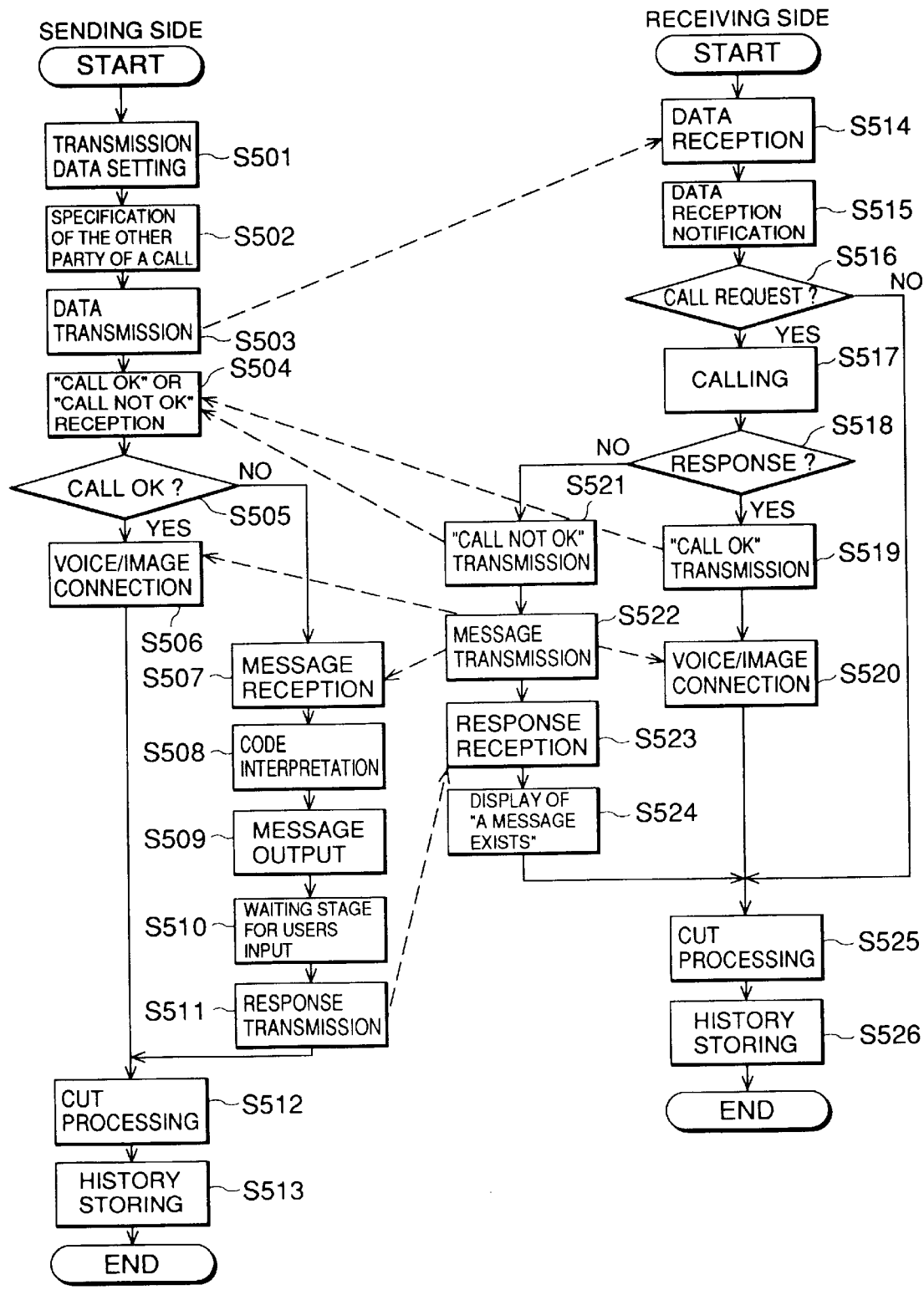
FIG. 27 is a flowchart showing the operation of a fourth embodiment of the terminal equipment of the present invention.
Figure 28:
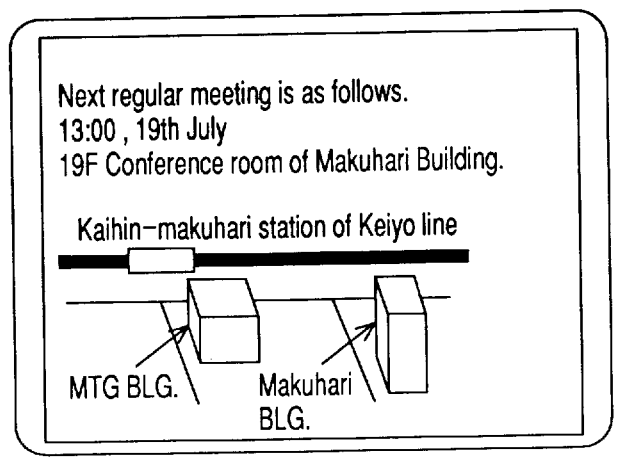
FIG. 28 is a diagram showing an example of the transmission data of the fourth embodiment.
Figure 29:
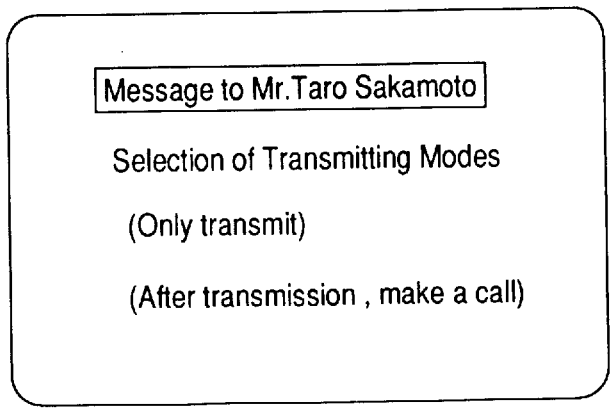
FIG. 29 is a diagram showing an example of the display for setting a request of talking of the fourth embodiment.

The operation of this embodiment will be described while referring to a flowchart of FIG. 27. First, transmission data is set (step S501). Document data previously made can also be specified, and transmission data may be made at that place. Then, the other party of the communication is specified (step S502) and the specified data is transmitted (step S503). The following steps S504 to S512 correspond to the steps S183 to S191 in the flowchart diagram of FIG. 16 of the first embodiment, respectively. At the receiving side the transmitted data is received (step S514) and the user is notified of the data reception (step S515). Then, whether there is a call request is checked (step S516). When there is a call request, the user is called (step S517). The following steps S518 to S526 correspond to the steps S195 to S203 in the flowchart diagram of FIG. 16 of the first embodiment, respectively. An example of the transmission data in this embodiment is shown in FIG. 28, and an example of the call request setting is shown in FIG. 29. In this case, if "After transmission, make a call" is selected, the other party will be called after the data shown in FIG. 28 is transmitted. With this, the transmitted data is displayed and a call becomes possible while viewing that display.

Figure 30:
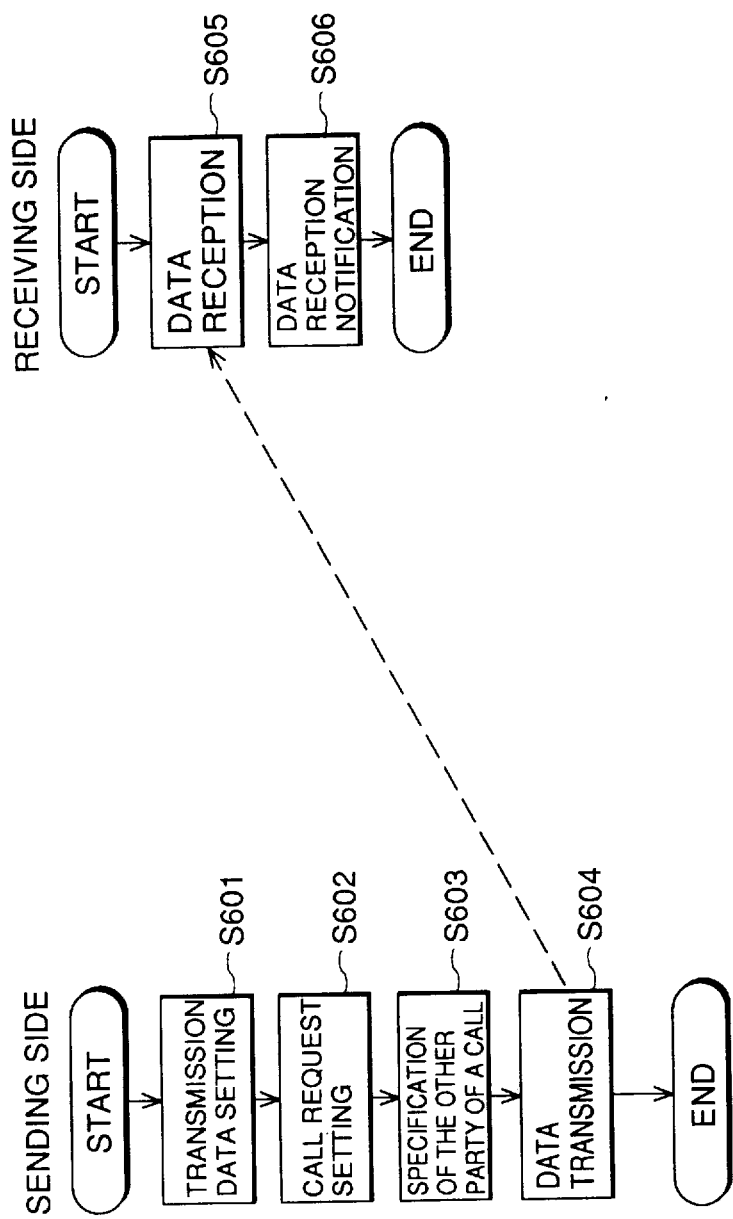
FIG. 30 is a flowchart showing the operation of a fifth embodiment of the terminal equipment of the present invention.

A fifth embodiment of the terminal equipment of the present invention will hereinafter be described while referring to the drawings. This embodiment has the same construction as any of the first to third embodiments described above and is provided with a function where transmission data and information requesting a call are sent to the other party at the same time, and when the other party reproduces the transmission data, a call to the other party is performed with a single operation. The operation of this embodiment will be described while referring to a flowchart of FIG. 30. First, transmission data is set (step S601) and a call request is set (step S602). Then, the other party of the communication is specified (step S603) and the specified data is transmitted (step S604). At the receiving side the transmitted data is received (step S605) and the user is notified of the data reception (step S606).

Figure 31:
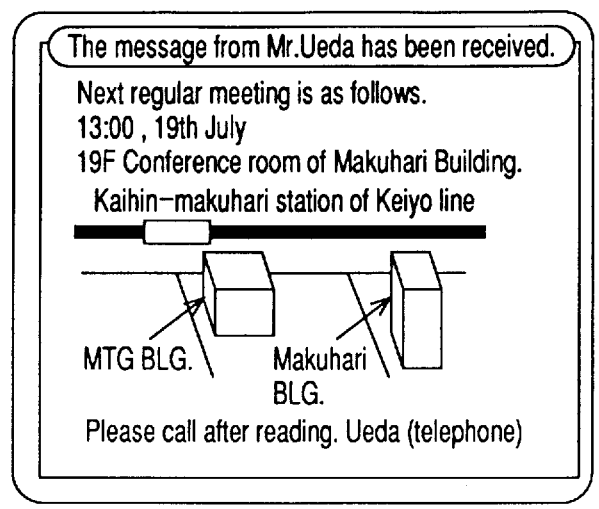
FIG. 31 is a diagram showing an example of the transmission data of the fifth embodiment.

This function is similar to the fourth embodiment, but the fourth embodiment meets the demand that a call is made immediately after document data is transmitted, i.e., at the same time a sender transmits a document, the sender desires to make a call. On the other hand, this embodiment meets the demand that a document is transmitted and a receiver desires to make a call when seeing the document. In other words, in the fourth embodiment a sender decides if a call is made, however, in this embodiment a receiver decides if a call is made. An example of displaying data transmitted by this embodiment is shown in FIG. 31. A display requesting to make a call after reading data is shown in the lower right of FIG. 31, and if this display is pressed, a call with the sender will become possible.

While the message at the time of absence, the telephone request immediately after data transmission, and the telephone request at the time of data display have been separately described in the first, fourth, and fifth embodiments, it is desirable that these operations be all performed with a single terminal. For this purpose, a judgment of whether the first request is a request to make a call or a request to send data is needed, but this judgment can be realized by first sending a code for judgment. If the judgment code is made so that a response is returned, a terminal which cannot interpret the judgment code cannot return a response and therefore it can be judged whether a terminal has the function of the above-mentioned embodiments.

A sixth embodiment of the terminal equipment of the present invention will hereinafter be described while referring to the drawings. This embodiment has the same construction as any of the first to third embodiments described above and the input data from a terminal has the same form as the absence message.

Figure 32:
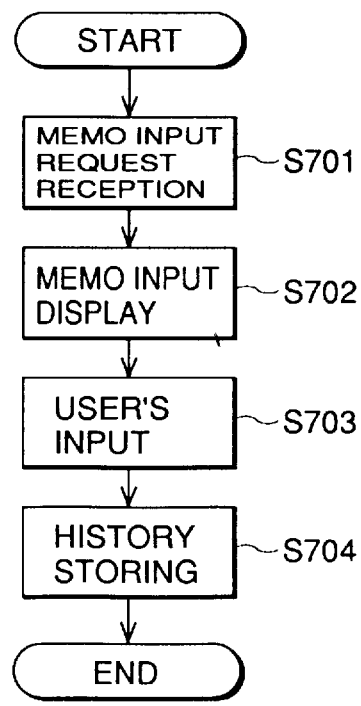
FIG. 32 is a flowchart showing the operation of a sixth embodiment of the terminal equipment of the present invention.

The operation of the data input of this embodiment will be described while referring to a flowchart of FIG. 32. First, a memo input request is received (step S701) and a screen for inputting a memo is displayed (step S702). Then, a user inputs a message (step S703) and the history is stored (step S704). The history stored here, as with other received histories, is processed according to the flowchart shown in FIG. 17. A display example of the memo input of this embodiment is shown in FIG. 33. Since a message which is sent from an external communication and a message which is input with this terminal are processed as the same history and are collectively displayed, the user does not need to process two messages, a message of a telephone and a message left on a desk. This invention can also have a selection such that when histories are displayed, only messages which are input by this terminal are displayed or not displayed according to a request from a user, or have a wide variety of sorting methods, such as a method of sorting messages in order of arrival time or in order of the other party name.

While the subject invention has been described with relation to the preferred embodiments, various modifications and adaptations thereof will now be apparent to those skilled in the art. All such modifications and adaptations as fall within the scope of the appended claims are intended to be covered thereby.

What is claimed is:

1. Communication equipment for transmitting and receiving information including all or some of characters, images, figures, voice, music data and digitized data, comprising:

resource information storing means for storing information on a resource comprising hardware and software for processing data;

negotiation means for communicating with other communication equipment on a receiving side to judge if said other communication equipment on the receiving side has the same resource; and conversion means which, when said other communication equipment on the receiving side does not have the same resource, performs data conversion, based on a conversion table stating conversion means for converting data to be transmitted to data that said other communication equipment on the receiving side can process, wherein the data to be transmitted includes a plurality of data groups each having information on data format thereof and said data groups include different data formats, said negotiation means judging if each of said data groups is convertible based on said information on the resource of said other communication equipment on the receiving side or said information on data format in the data to be transmitted, and said conversion means converting data groups in said plurality of data groups based on the result of the judgement on the convertibility.

2. A communication equipment as set forth in claim 1, further comprising:

performance evaluation value storing means for storing a performance evaluation value representative of calculation performance of said communication equipment; and performance comparing means for comparing said performance evaluation value of said communication equipment with a performance evaluation value of said other communication equipment on the receiving side; and wherein said performance evaluation value of said communication equipment and said performance evaluation value of said other communication equipment on the receiving side are compared and said data conversion is performed with one of said communication equipment which is superior in performance evaluation value.

3. A communication equipment as set forth in claim 1, further comprising:

original-address storing means for storing where original data exists with respect to each data; and original-address adding means for adding, at the time of communication, information on where original data exists; and wherein, when said original data is desired to be obtained at said other communication equipment on the receiving side, said original data is obtained from the other communication equipment having said original data, based on an instruction from a user.

4. A communication equipment as set forth in claim 1, wherein said conversion table and said resource information storing means are a writable medium.

5. A communication equipment as set forth in claim 1, further comprising:

conversion requesting means for requesting data conversion of a third communication equipment differing from said communication equipment and said other communication equipment on the receiving side; and conversion accepting means for accepting conversion from the other communication equipment; and wherein, when data cannot be converted at said communication equipment to a form that said other communication equipment on the receiving side can process, data conversion is requested of said third communication equipment and the converted data is sent to said other communication equipment on the receiving side.

6. A communication equipment as set forth in claim 1, further comprising:

communication time estimating means for estimating a communication time needed for data transmission for each of various data conversions;

display means for displaying an evaluation time of said communication time for each said data conversion; and selection means for selecting an arbitrary method based on information on the kind of said data conversion and said communication time displayed on the said display means.

7. A communication equipment as set forth in claim 1, further comprising:

output-information storing means for storing information including software for processing current data to be transmitted, and wherein, when said other communication equipment does not have said information including software for processing current data but communication equipment on a sending side has said information, said information is transmitted together with said current data.

8. A communication equipment as set forth in claim 1, wherein each of data groups includes said information on data format at the top thereof.

9. Terminal equipment for transmitting and receiving a message consisting of data such as voice, characters, and figures, and a code controlling an operation of a terminal, comprising:

absence judging means which, when a message is received, judges that a user is absent;

transmitting means which, when the user is judged to be absent by said absence judging means, automatically transmits an absence message to a sender of the received message, said absence message including a code for controlling an output of a terminal of said sender;

code information control means for interpreting said code when said absence message including said code is received, and for controlling said terminal equipment in accordance with the interpretation of said code;

secondary storage means for storing transmission messages, reception messages, a history of transmission and receptions, and data characteristic to senders; and display means for displaying said history stored in said secondary storage means as character information.

10. A terminal equipment as set forth in claim 9, where said code information control means which, when the user selects the other party of transmission from said history displayed on said display means, provides control so that a message is transmitted by use of said data stored in said secondary storage means.

11. A terminal equipment as set forth in claim 9, further comprising fixed-pattern storage means for storing a plurality of patterns of said absence message.

12. A terminal equipment as set forth in claim 9, further comprising message editing means for a user to make said absence message.

13. A terminal equipment as set forth in claim 10, where said code information control means receives a message including a code requesting communication and provides control so that communication with a sender is performed when the user selects performing communication.

14. A terminal equipment as set forth in claim 10, where said code information control means provides control so that when a message is displayed, a message including a code requesting communication is displayed on said display means and when the user selects performing communication, communication with a sender is performed.

15. A terminal equipment as set forth in claim 9, where said secondary storage means stores data, which the user inputs, in the same data form as said absence message.

16. A terminal equipment as set forth in claim 9, wherein said code includes a code for controlling the terminal of said sender to request a reply to said absence message.

* * * * *

UNITED STATES PATENT AND TRADEMARK OFFICE
CERTIFICATE OF CORRECTION

PATENT NO. : 5,835,789
DATED      : November 10, 1998
INVENTOR(S): UEDA et al.

It is certified that error appears in the above-identified patent and that said Letters Patent are hereby corrected as shown below:

On the cover page of Patent No. 5,835,789, please insert the following under the heading "U.S. Patent Documents":

4,648,061  3/1987  Foster 4,672,459  6/1987  Kudo

After 5,261,052 in the left column of the front page of the patent, insert the following line:

5,283,887  2/1994  Zachery

In the right column of the front page, insert after the heading "Foreign Patent Documents" the following three lines:

0652668  5/1995  European 9406230  3/1994  WO

Patent Abstracts of Japan, Vol. 16, No. 286, 6/1992 (JP 04 076758, 3/1992).

Signed and Sealed this

Tenth Day of April, 2001

Attest:

NICHOLAS P. GODICI

*Attesting Officer*     Acting Director of the United States Patent and Trademark Office